(12) United States Patent
Park et al.

(10) Patent No.: US 8,564,257 B2
(45) Date of Patent: Oct. 22, 2013

(54) POWER FACTOR CORRECTION CIRCUIT WITH OVER-VOLTAGE DETECTION AND DRIVING METHOD THEREOF

(75) Inventors: Young-Bae Park, Anyang (KR); Sang Cheol Moon, Bucheon (KR); Byoung Heon Kim, Bucheon (KR); Byung Kwon Choi, Bucheon (KR); Cheng Sung Chen, Hsinchu (TW)

(73) Assignee: Fairchild Korea Semiconductor Ltd., Bucheon (KR)

( * ) Notice: Subject to any disclaimer, the term of this patent is extended or adjusted under 35 U.S.C. 154(b) by 381 days.

(21) Appl. No.: 12/912,329

(22) Filed: Oct. 26, 2010

(65) Prior Publication Data

US 2011/0095733 A1  Apr. 28, 2011

(30) Foreign Application Priority Data

Oct. 26, 2009  (KR) .................. 10-2009-0101680
Oct. 25, 2010  (KR) .................. 10-2010-0103824

(51) Int. Cl.
*G05F 1/40* (2006.01)
*G05F 5/00* (2006.01)

(52) U.S. Cl.
USPC .......................................... 323/235; 323/207

(58) Field of Classification Search
USPC .................................................. 323/207, 235
See application file for complete search history.

(56) References Cited

U.S. PATENT DOCUMENTS

| | | | | |
|---|---|---|---|---|
| 7,449,844 B2 * | 11/2008 | Lev et al. | ...................... | 315/291 |
| 2005/0219871 A1 * | 10/2005 | Li et al. | ........................ | 363/21.1 |
| 2010/0226149 A1 * | 9/2010 | Masumoto | ...................... | 363/20 |
| 2011/0110127 A1 * | 5/2011 | Lee | ................................. | 363/44 |

* cited by examiner

*Primary Examiner* — Adolf Berhane
*Assistant Examiner* — Emily Pham
(74) *Attorney, Agent, or Firm* — Okamoto & Benedicto LLP

(57) ABSTRACT

The present invention relates to a power factor correction circuit and a driving method thereof.

The power factor correction circuit includes a power switch controlling an inductor current flowing in an inductor, an auxiliary inductor coupled to the inductor with a predetermined turn ratio, and a power factor correction controller controlling output power by controlling a switching operation of the power switch.

The power factor correction controller determines whether or not an output voltage of the output power is an over-voltage by using the sum of a source current and a sink current that control a zero current detection voltage to be included within a predetermined clamping range, the zero current detection voltage corresponding to an auxiliary voltage that is a both-end voltage of an auxiliary inductor.

32 Claims, 11 Drawing Sheets

POWER FACTOR CORRECTION CIRCUIT WITH OVER-VOLTAGE DETECTION AND DRIVING METHOD THEREOF

CROSS-REFERENCE TO RELATED APPLICATION

This application claims priority to and the benefit of Korean Patent Application No. 10-2009-0101680 filed in the Korean Intellectual Property Office on Oct. 26, 2009, and Korean Patent Application No. 10-2010-0103824 filed in the Korean Intellectual Property Office on Oct. 25, 2010, the entire contents of which are incorporated herein by reference.

BACKGROUND OF THE INVENTION (a) Field of the Invention

The present invention relates to a power factor correction circuit and a driving method thereof.

(b) Description of the Related Art

A control circuit of a typical power factor correction circuit (hereinafter, a power factor correction control circuit) receives a feedback voltage corresponding to an output voltage, and controls the output voltage according to the feedback voltage so as to keep the output voltage constant.

When a control response of the power factor correction control circuit is slow, the output voltage may be an over-voltage. In order to prevent this, the power factor correction control circuit includes an over-voltage protection function for determining the output voltage as an over-voltage when the feedback voltage is higher than a predetermined voltage. In this case, the output voltage is divided by using a resistor element in order to control the feedback voltage to be included within a voltage range suitable for the power factor correction control circuit. Since the voltage division is performed by using the resistor element, a very large resistor is used to reduce power consumption caused by the resistor. At this point, if the resistance value is changed due to damage to the resistor element or the resistor element is damaged and cut off, the feedback voltage does not correspond to the output voltage, and a significant difference is generated between information about the actual output voltage and information about the output voltage delivered to the power factor correction control circuit. Moreover, a bulk capacitor connected to the output terminal of the power factor correction circuit and storing an output voltage has a fairly large capacitance. If the bulk capacitor is damaged due to over-voltage, the capacitor may explode and cause a loud noise. This is quite a large disadvantage from a user's perspective.

To avoid this, a method of preventing an over-voltage by additionally connecting a resistor element to an output terminal may be used. However, this causes an increase in production costs due to an increase in power consumption and expense of additional parts.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the aforementioned problems, and to provide a power factor correction circuit that can detect an over-voltage of an output voltage without detecting the output voltage using a resistor element, and a driving method thereof.

A power factor correction circuit according to an exemplary embodiment of the present invention includes an inductor, a power switch, an auxiliary inductor, and a power factor correction controller. The inductor receives an input voltage and supplies output power, and the power switch is connected to the inductor and controls an inductor current flowing in the inductor. The auxiliary inductor is coupled to the inductor with a predetermined turn ratio. The power factor correction controller controls the output power by controlling a switch operation of the power switch and determines an over-voltage of an output voltage of the output power. The power factor correction controller determines whether the output voltage is an over-voltage by using the sum of a source current and a sink current that control a zero current detection voltage to be included within a predetermined clamping range, the zero current detection voltage corresponding to an auxiliary voltage that is a both-end voltage of the auxiliary inductor. The power factor correction circuit does not determine whether or not the output voltage is an over-voltage when the sink current is not generated by the input voltage at the peak value and the source current is greater than the over-voltage reference value. The clamping range is lower than a positive clamping voltage and higher than a negative clamping voltage, and the sink current is generated when the auxiliary voltage is higher than the positive clamping voltage and the source current is generated when the source current is lower than the negative clamping voltage. The power factor correction controller determines the output voltage as an over-voltage when the sum of the source current and the sink current is greater than a predetermined over-voltage reference value. The power factor correction controller does not determine whether or not the output voltage is an over-voltage when the auxiliary voltage is lower than the positive clamping voltage.

The power factor correction controller includes an over-voltage protection unit that respectively detects the sink current and the source current and adds them, compares the sum result with the over-voltage reference value, and determines the output voltage as an over-voltage when the sum result is greater than the over-voltage reference value. The clamping range is lower than a positive clamping voltage and higher than a negative clamping voltage, and the power factor correction controller further includes a clamping unit that generates the sink current when the auxiliary voltage is higher than the positive clamping voltage and generates the source current when the auxiliary voltage is lower than the negative clamping voltage. The over-voltage protection unit does not determine whether or not the output voltage is an over-voltage when the auxiliary voltage is lower than the positive clamping voltage.

The over-voltage protection circuit includes a detection current adding unit adding a detection source current corresponding to the source current and a detection sink current corresponding to the sink current, a protection determining unit determining whether or not the output voltage is an over-voltage by comparing the sum result with the over-voltage reference value, and an auxiliary controller disabling the protection determining unit when the auxiliary voltage is lower than the positive clamping voltage. The protection determining unit includes a comparator that compares the sum result with the over-voltage reference value, and the protection controller disables the comparator when the auxiliary voltage is lower than the positive clamping voltage and enables the comparator when the auxiliary voltage is higher than the positive clamping voltage.

The protection controller includes a comparator including a first input terminal to which the detection sink current is input and a second input terminal to which a predetermined threshold current is input, and the comparator generates a control signal that disables the protection determining unit when the detection sink current is less than the threshold current. The comparator generates a control signal that enables the protection determining unit when the detection sink current is greater than the threshold current.

The over-voltage protection unit further includes a source current detection unit detecting the source current, a first current mirror unit generating a detection source current by mirroring the detected source current, a sink current detection unit detecting the sink current, and a second current mirror unit generating a detection sink current by mirroring the detected sink current. The detection current adding unit includes a first maintaining unit receiving the detection source current and generating a first peak voltage corresponding to the detection source current, a second maintaining unit receiving the detection sink current and generating a second peak voltage corresponding to the detection sink current, and an adding unit adding the first and second peak voltages and generating a sum voltage corresponding to the sum result.

The first maintaining unit includes a first diode to which the detection source current is transmitted, a first resistor of which a first end is connected to a cathode of the first diode and a second end is grounded, and a first capacitor of which a first end is connected to the cathode of the first diode and a second end is grounded. The second maintaining unit includes a second diode to which the detection sink current is transmitted, a second resistor of which a first end is connected to a cathode and a second end is grounded, and a second capacitor of which a first end is connected to the cathode of the second diode and a second end is grounded. The first peak voltage is a first end voltage of the first capacitor and the second peak voltage is a first end voltage of the second capacitor. The adding unit includes a first resistor of which a first end receives the first peak voltage, a second resistor of which a first end receives the second peak voltage, a third resistor of which a first end is grounded, a comparator including a first input terminal connected to the second end of the first resistor and the second end of the second resistor and a second input terminal connected to the second end of the third resistor, and a fourth resistor of which a first end is connected to the second input terminal of the comparator and a second end is connected to the output terminal of the comparator. The sum result is a voltage at the output terminal of the comparator.

The power factor correction controller includes an over-voltage protection unit that samples and holds the sink current by being synchronized at the turn-off time of the power switch to generate a first sampling voltage, samples and holds the source current by being synchronized at the turn-on time of the power switch to generate a second sampling voltage, adds the first sampling voltage and the second sampling voltage, compares the addition result with the over-voltage reference value, and determines the output voltage to be an over-voltage when the addition result is higher than the over-voltage reference value.

The over-voltage protection unit includes a first sample hold unit generating the first sampling voltage according to an inverse gate signal inverted from a gate signal that controls the switching operation of the power switch, a second sample hold unit generating the second sampling voltage according to the gate signal, and an adding unit adding the first sampling voltage and the second sampling voltage.

The clamping range is lower than a positive clamping voltage and higher than a negative clamping voltage, and the power factor correction controller further includes a clamping unit that generates the sink current when the auxiliary voltage is higher than the positive clamping voltage and generates the source current when the auxiliary voltage is lower than the negative clamping voltage. The over-voltage protection unit does not determine whether or not the output voltage is an over-voltage when the auxiliary voltage is lower than the positive clamping voltage.

The power factor correction controller includes an over-voltage protection unit that generates a third sampling voltage by sampling and holding the sink current at a time delayed for a first delay period from a turn-off time of the power switch, generates a fourth sampling voltage by sampling and holding the source current at a time delayed for a second delay period from a turn-on time of the power switch, adds the third sampling voltage and the fourth sampling voltage, compares the addition result with the over-voltage reference value, and determines the output voltage to be an over-voltage when the addition result is higher than the over-voltage reference value.

The over-voltage protection unit includes a first delay unit receiving an inverse gate signal inverted from a gate signal that controls a switching operation of the power switch and generating a first sampling pulse at a time delayed for the first delay period from the turn-off time of the power switch, a third sample hold unit generating the third sampling voltage according to the first sampling pulse, a second delay unit receiving the gate signal and generating a second sampling pulse at a time delayed for the second delay period from the turn-on time of the power switch, and a fourth sample hold unit generating the fourth sampling voltage according to the second sampling pulse.

The clamping range is lower than a positive clamping voltage and higher than a negative clamping voltage, and the power factor correction controller further includes a clamping unit generating the sink current when the auxiliary voltage is higher than the positive clamping voltage and generating the source current when the auxiliary voltage is lower than the negative clamping voltage. The over-voltage protection circuit does not determine whether or not the output voltage is an over-voltage when the auxiliary voltage is lower than the positive clamping voltage.

A driving method according to another exemplary embodiment of the present invention is provided to a power factor current circuit including an inductor receiving an input voltage and supplying output power, a power switch connected to the inductor and controlling an inductor current flowing in the inductor, and an auxiliary inductor coupled to the inductor with a predetermined turn ratio. The driving method includes generating a source current and a sink current that control a zero current detection voltage to be included within a predetermined clamping range, the zero current detection voltage corresponding to an auxiliary voltage that is a both-end voltage of the auxiliary inductor, adding the source current and the sink current, and determining whether or not an output voltage of the output power exists by comparing the sum result and a predetermined over-voltage reference value. The clamping range is lower than a positive clamping voltage and higher than a negative clamping voltage, and the generating of the source current and the sink current includes generating the sink current when the auxiliary voltage is higher than the positive clamping voltage and generating the source current when the auxiliary voltage is lower than the negative clamping voltage. The determining whether or not the output voltage is an over-voltage further includes determining the output voltage as an over-voltage when the sum of the source current and the sink current is greater than the over-voltage reference value. Whether or not the output voltage is an over-voltage is not determined when the sink current is not generated by the input voltage at the peak value and the source current is greater than the over-voltage reference value.

The adding of the source current and the sink current includes generating a first sampling voltage by being synchronized at the turn-off time of the power switch and sampling and holding the source current, generating a second sampling voltage by being synchronized at the turn-on time of the power switch and sampling and holding the source current, and adding the first sampling voltage and the second sampling voltage.

In addition, the adding of the source current and the sink current includes generating a third sampling voltage by sampling and holding the sink current at a time delayed for a first delay period from the turn-off time of the power switch, generating a fourth sampling voltage by sampling and holding the source current at a time delayed for a second delay period from the turn-on time of the power switch, and adding the third sampling voltage and the fourth sampling voltage.

In the generating of the third sampling voltage, a first sampling pulse is generated at a time delayed for the first delay period from the turn-off time of the power switch by an inverse gate signal inverted from a gate signal that controls switching operation of the power switch, and the third sampling voltage is generated according to the first sampling pulse.

In the generating of the fourth sampling voltage, a second sampling pulse is generated at a time delayed for the second delay period from the turn-on time of the power switch by the gate signal, and the fourth sampling According to the present invention, there is provided a power factor correction circuit that can determine whether or not an output voltage is an over-voltage without directly detecting the output voltage, and a driving method thereof. In comparison with the prior art that detects an output voltage using a resistor element, power consumption is reduced.

DETAILED DESCRIPTION OF THE EMBODIMENTS

Figure 1:
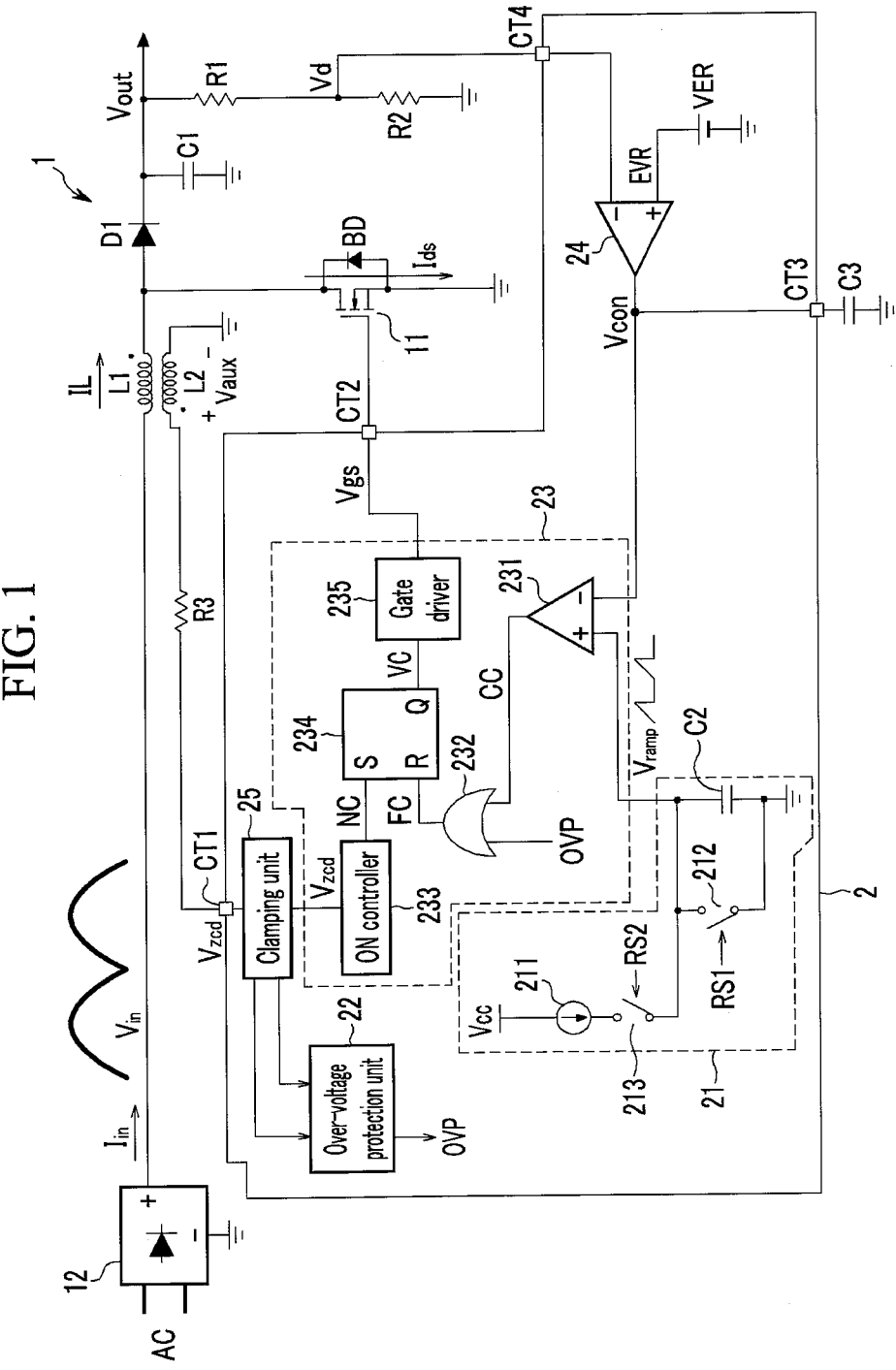
FIG. 1 shows a power factor correction circuit according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be directly coupled to the other element or electrically coupled to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a power factor correction circuit 1 according to an exemplary embodiment of the present invention.

As shown in FIG. 1, the power factor correction circuit 1 includes a power factor correction controller 2, a power switch 11, a bridge diode 12, a diode D1, a capacitor C1, an inductor L1, an auxiliary inductor L2, division resistors R1 and R2, and a zero-current detection resistor R3. The power switch 11 according to the exemplary embodiment of the present invention is formed of an n-channel metal oxide semiconductor field effect transistor (NMOSFET). A body diode BD is formed between a drain electrode and a source electrode of the power switch 11. A current flowing in the power switch 11 is hereinafter referred to as a drain current Ids.

The bridge diode 12 is formed of four diodes (not shown), and generates an input voltage Vin by wave-rectifying input AC power.

A first end of the inductor L1 is supplied with the input voltage Vin and a second end thereof is connected to an anode of the diode D1. An input current Iin viewed from the bridge diode 12 is a sine wave that is wave-rectified with an average value of an inductor current IL that increases/decreases according to a switching operation of the power switch 11.

A drain electrode of the power switch 11 is connected to the anode of the diode D1 and the second end of the inductor L1.

The inductor L1 receives the input voltage Vin and generates an output voltage. The switching operation of the power switch 11 controls the inductor current IL flowing in the inductor L1. With a triangle-shaped waveform, the inductor current is increased during a turn-on period of the power switch 11 and decreased during a turn-off period of the power switch 11, and the increase and decrease of the inductor current are repeated. In further detail, during the turn-on period of the power switch 11, the inductor current IL is increased and the inductor L1 stores energy. During the turn-off period of the power switch 11, the inductor current IL flows through the diode D1 and the energy stored in the inductor L1 is transmitted to the output end of the power factor correction circuit 1.

When the power switch 11 is turned off and the diode D1 is connected, the inductor current IL flows to a load connected to the output end of the power factor correction circuit 1 and charges the capacitor C1. Since the inductor current IL supplied to the load connected to the output end of the power factor correction circuit 1 is increased as the load is increased, the current flowing to the capacitor C1 is decreased so that the output voltage Vout is decreased. On the contrary, when the load is decreased, the inductor current IL is decreased and the current flowing to the capacitor C1 is increased so that the output voltage Vout is increased.

When the power switch 11 is turned on, the diode D1 is disconnected and the inductor current IL flows through the power switch 11. The power factor correction controller 2 generates an error amplification signal by using a division voltage Vd that is divided according to a resistance ratio (R2/(R1+R2)) of the division resistors R1 and R2, and determines a turn-off time of the power switch 11 by comparing the error amplification signal Vcon with a ramp signal Vramp having a predetermined cycle.

A turn-on time of the power switch 11 is determined according to a zero-current detection voltage Vzcd that corresponds to a voltage (hereinafter referred to as an auxiliary voltage Vaux) of the auxiliary inductor L2. The auxiliary inductor L2 is coupled to the inductor L1 with a predetermined turn ratio n (n=turns of the auxiliary inductor L2/turns of the inductor L1). A voltage obtained by multiplying the both-end voltage of the inductor L1 by the turn ratio is the both-end voltage of the auxiliary inductor L2. The auxiliary inductor L2 supplies a power source voltage to a power factor correction control circuit 2 or detects the zero point of the inductor current IL.

For determination of the over-voltage of the output voltage Vout, a current flowing to the auxiliary inductor according to the auxiliary voltage Vaux is used according to the exemplary embodiment of the present invention. In further detail, the auxiliary voltage Vaux is determined according to the turn-on state of the power switch 11, the input voltage Vin, the output voltage Vout, and the turn ratio n, and the current flowing to the auxiliary inductor L2 varies according to the auxiliary voltage Vaux. A current flowing from the auxiliary inductor L2 to the power factor correction controller 2 is referred to as a sink current ISI, and a current flowing from the power factor correction controller 2 to the auxiliary inductor L2 is referred to as a source current ISO. The zero current detection voltage Vzcd corresponding to the auxiliary voltage Vaux is transmitted to the power factor correction controller 2 through a connection terminal CT1, and a range of the zero current detection voltage Vzcd does not exceed a predetermined clamping range. Since the auxiliary voltage Vaux has a value exceeding the clamping range, a current for controlling the zero current detection voltage Vzcd to be included within the clamping range is supplied from the power factor correction controller 2 or flows to the power factor correction controller 2. The source current ISO is supplied from the power factor correction controller 2 and the sink current ISI flows to the power factor correction controller 2. The clamping range according to the exemplary embodiment of the present invention has a negative clamping voltage and a positive clamping voltage as the lowest and highest limits.

The power factor correction controller 2 according to the exemplary embodiment of the present invention determines the output voltage Vout as an over-voltage when the sum of the sink current ISI and the source current ISO is greater than a predetermined over-voltage reference value. This will be described in further detail later with reference to FIG. 2 to FIG. 5.

First, a relationship between the auxiliary voltage Vaux, the turn-on state of the power switch 11, the input voltage Vin, the output voltage Vout, and the turn ratio n will be described in further detail.

Figure 2A:
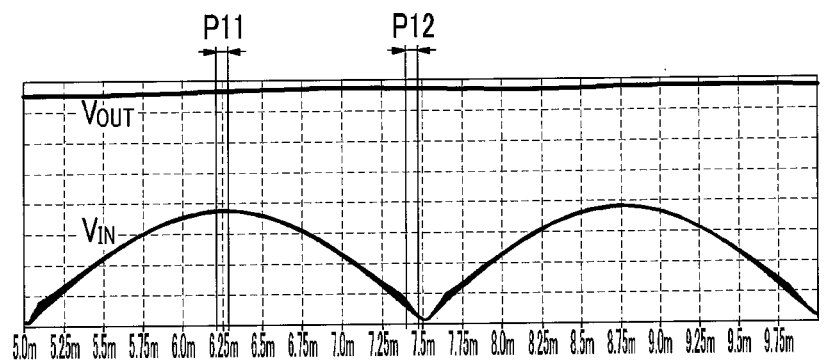
FIG. 2A shows waveforms of an input voltage and an output voltage.

FIG. 2A shows waveforms of the input voltage Vin and the output voltage Vout.

Figure 2B:
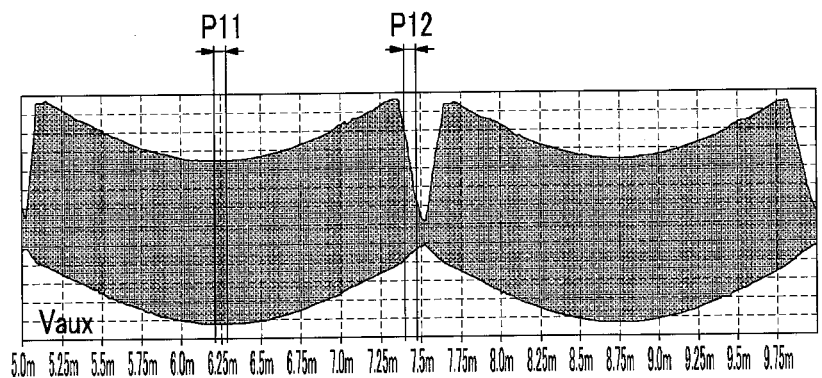
FIG. 2B shows a waveform of an auxiliary voltage.

FIG. 2B shows a waveform of the auxiliary voltage Vaux.

In FIG. 2B, the waveform of the auxiliary voltage is marked by shadowing because the waveform of the auxiliary voltage varies according to the switching operation.

The auxiliary voltage Vaux will be described in further detail with reference to FIG. 2C and FIG. 2D.

Figure 2C:
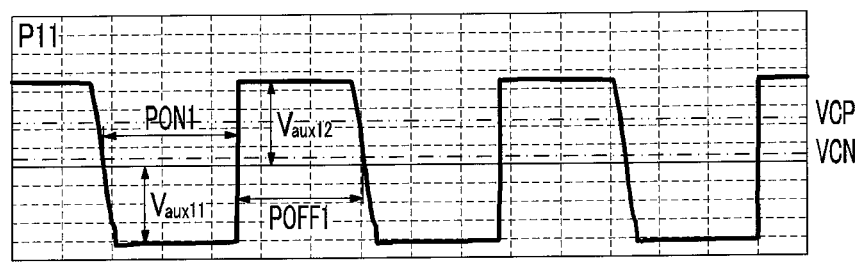
FIG. 2C shows a waveform of the auxiliary voltage during a first period during which the input voltage includes a peak point.

FIG. 2C shows a waveform of the auxiliary voltage Vaux for a first period P11 that includes the peak point of the input voltage Vin. FIG. 2D shows a waveform of the auxiliary voltage Vaux for a second period P12 during which the input voltage Vin is close to the ground voltage.

The auxiliary voltage Vaux may be represented as Equation 1 and Equation 2 by using the input voltage Vin, the output voltage Vout, and a turn ratio (Naux/Nin) of the inductor L1 and the auxiliary inductor L2. Equation 1 represents an auxiliary voltage Vaux when the power switch 11 is turned off, and Equation 2 represents an auxiliary voltage Vaux when the power switch 11 is turned on.

$$Vaux=n(Vout-Vin) \qquad \text{[Equation 1]}$$

$$Vaux=-nVin \qquad \text{[Equation 2]}$$

Figure 2D:
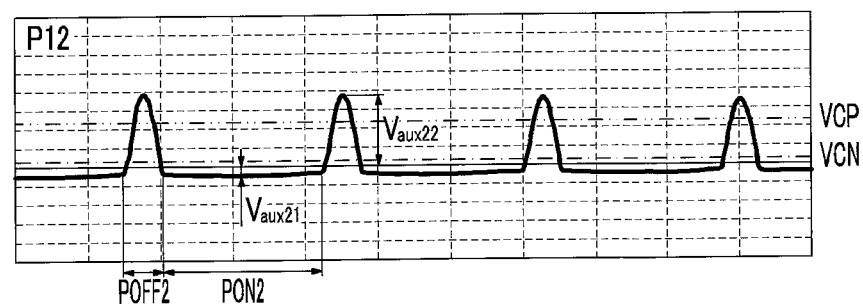
FIG. 2D shows a waveform of the auxiliary waveform during a second period during which the input voltage is close to a ground voltage.

As shown in FIG. 2C and FIG. 2D, the auxiliary voltage Vaux is a negative voltage during turn-on periods PON1 and PON2 of the power switch 11, and the auxiliary voltage Vaux is a positive voltage during turn-off periods POFF1 and POFF2 of the power switch 11.

As shown in FIG. 2C, during the first period P11, the auxiliary voltage Vaux becomes a negative voltage Vaux11 when the power switch 11 is turned on and the auxiliary voltage Vaux becomes a positive voltage Vaux12 when the power switch 11 is turned off.

As shown in FIG. 2D, during the second period, the auxiliary voltage Vaux becomes a negative voltage Vaux21 when the power switch 11 is turned on and the auxiliary voltage Vaux becomes a positive voltage Vaux22 when the power switch 11 is turned off.

The power factor correction control circuit 2 receives the zero current detection voltage Vzcd corresponding to the auxiliary voltage Vaux through the connection terminal CT1. The connection terminal CT1 is connected to a first end of the zero-current detection resistor R3, and a second end of the zero-current detection resistor R3 is connected to the auxiliary inductor L2. The zero current detection voltage Vzcd according to the exemplary embodiment of the present invention equals a voltage at the first end of the resistor R3.

It is not preferable to input a negative voltage to an IC in which the power factor correction control circuit 2 is substantially realized. The negative voltage generally generates stress in the IC. In order to prevent this, the zero current detection voltage Vzcd is increased to a negative clamping voltage VCN which is a predetermined positive voltage when the auxiliary voltage Vaux is a negative voltage in the exemplary embodiment of the present invention. Therefore, the lowest value of the zero current detection voltage Vzcd is substantially the negative clamping voltage VCN.

In the exemplary embodiment of the present invention, a current is supplied to the auxiliary inductor L2 in order to increase the zero current detection voltage Vzcd to the negative clamping voltage VCN. The current supplied to the auxiliary inductor L2 is the source current ISO. When the auxiliary voltage Vaux is a negative voltage, the source current ISO is more required as an absolute value of the auxiliary voltage Vaux is high. As previously described, during the turn-on period of the power switch 11, the absolute value of the auxiliary voltage Vaux is proportional to the input voltage, and therefore a large source current is required for increasing the zero current detection voltage Vzcd to the negative clamping voltage VCN.

This can be represented as given in Equation 3.

$$ISO=(nVin+VCN)/R3 \quad \text{[Equation 3]}$$

On the contrary, the auxiliary voltage Vaux may generate stress in the IC in which the power factor correction control circuit 2 is realized when the auxiliary voltage Vaux is a high positive voltage. In order to prevent this, in the exemplary embodiment of the present invention, the zero current detection voltage Vzcd is clamped to a positive voltage VCP when the auxiliary voltage Vaux is higher than a predetermined positive clamping voltage VCP. Therefore, the highest value of the zero current detection voltage Vzcd is substantially the positive clamping voltage VCP.

In the exemplary embodiment of the present invention, the current flowing to the auxiliary inductor L2 is synchronized in a direction of the power factor correction controller 2 in order to decrease the zero current detection voltage Vzcd to the positive clamping voltage VCP. This current is the sink current ISI. When the auxiliary voltage Vaux is a positive voltage, generation of the sink current ISI is increased as the absolute value of the auxiliary voltage Vaux is increased. As previously described, during the turn-off period of the power switch 11, the absolute value of the auxiliary voltage Vaux is increased as the input voltage Vin is decreased, and therefore a large sink current is generated in order to decrease the zero current detection voltage Vzcd to the positive clamping voltage VCN.

This can be represented as given in Equation 4.

$$ISI=(n(Vout-Vin)-VCP)/R3 \quad \text{[Equation 4]}$$

The sum of the source current ISO and the sink current ISI of Equations 3 and 4 is as given in Equation 5.

$$ISO+ISI=(nVout-VCP+VCN)/R3 \quad \text{[Equation 5]}$$

In Equation 5, n, VCP, VCN, and R2 are fixed values, and therefore the output voltage Vout can be predicted if the sum of the source current ISO and the sink current ISI is known. The negative clamping voltage VCN is a very small voltage that is close to the zero voltage. Therefore, the negative clamping voltage VCN can be disregarded.

With the configuration described above, an over-voltage of the output voltage Vout can be determined. A configuration for realizing this will be described later with reference to FIG. 3.

Referring to FIG. 1, the power factor correction circuit according to the exemplary embodiment of the present invention is a boundary conductive mode. Thus, when the power switch 11 is turned off and the inductor current IL is zero, a resonance is generated between the inductor L1 and a parasitic capacitor (not shown) of the power switch 11. Then, the voltage of the inductor L1 is decreased in a sine wave form, the auxiliary voltage Vaux is decreased, and the zero current detection voltage Vzcd is decreased. Once the zero current detection voltage Vzcd starts to decrease, the power factor correction controller 2 detects that the inductor current IL is zero and turns off the power switch 11 after a predetermined delay. In further detail, when the zero current detection voltage Vzcd is decreased to a predetermined on-reference voltage, the power factor correction controller 2 turns on the power switch 11. Hereinafter, the power factor correction controller 2 will be described in further detail.

The power factor correction controller 2 includes a ramp signal generator 21, an over-voltage protection unit 22, a PWM controller 23, an error amplifying unit 24, and a clamping unit 25.

The error amplifying unit 24 generates an error amplification signal Vcon by amplifying a difference between an error reference voltage VER of a reference voltage source VER and a division voltage Vd. The capacitor C3 is connected to an output end of the error amplifying unit 24. The error amplification signal Vcon is amplified with a predetermined gain through the capacitor C3, and is controlled and corrected by being delayed for a predetermined period. The error amplifying unit 24 includes an inversion (−) terminal to which the division voltage Vd is input through a connection terminal CT4, and a non-inversion (+) terminal to which the predetermined error reference voltage VER is input. The capacitor C3 is connected to the output end of the error amplifying unit 24 through the connection terminal CT3, and is disposed at the output side of the power factor correction controller 2.

The ramp signal generator 21 generates a ramp signal Vramp that increases with a predetermined slope during the turn-on period of the power switch 11. The ramp signal generator 21 includes a constant current source 211, a discharge switch 212, a charge switch 213, and a capacitor C2. A first end of the constant current source 211 is connected with a first end of the charge switch 213, and a second end of the charge switch 213 is connected to first ends of the discharge switch 212 and the capacitor C2. The discharge switch 212 and the capacitor C2 are connected in parallel, and second ends of the discharge switch 212 and the capacitor C2 are grounded. During the turn-on period of the power switch 11, the charge switch 213 is turned on by a switching signal RS2 and the discharge switch 212 is turned off by a switching signal RS1. Then, a current of the constant current source 211 charges the capacitor C2 so that the ramp signal Vramp is increased with a slope according to the current of the constant current source 211. During the turn-off period of the power switch 11, the charge switch 213 is turned off by the switching signal RS2 and the discharge switch 212 is turned on by the switching signal RS1. Then, the current of the constant current source 211 is blocked and the capacitor C2 is discharged so that the ramp signal Vramp is grounded after being rapidly discharged.

The PWM controller 23 generates a gate control signal Vgs to control the switching operation of the power switch 11 by using the zero current detection voltage Vzcd, the ramp signal Vramp, and the error amplification signal Vcon. The PWM controller 23 includes a PWM comparator 231, an OR gate 232, an ON controller 233, a PWM flip-flop 234, a gate driver 235, and an inverter 236.

The PWM comparator 231 generates a comparison result signal CC by comparing the ramp signal Vramp and the error amplification signal Vcon. The PWM comparator 231 includes a non-inversion (+) terminal to which the ramp signal Vramp is input and an inversion (−) terminal to which the error amplification signal Vcon is input. The PWM comparator 231 generates a high-level comparison result signal CC when the ramp signal Vramp is higher than the error amplification signal Vcon, and generates a low-level comparison result signal CC when the ramp signal Vramp is lower than the error amplification signal Vcon. Therefore, when the increasing ramp signal Vramp reaches the error amplification signal Vcon, a high-level comparison result signal CC is output.

The OR gate 232 receives an over-voltage protection signal OVP and the comparison result signal CC, and outputs a high-level OFF control signal when one of the two received signals is high level. When the OFF control signal FC is high level, a gate control signal Vgs that turns off the power switch 11 is generated.

The ON controller 233 generates an ON control signal NC to turn on the power switch 11 when the zero current detection voltage Vzcd is lower than an ON reference voltage. The ON control signal generator 232 is synchronized at an ON control time when the zero voltage detection voltage Vzcd that decreases after the power switch 11 is turned off is lower than the ON reference voltage.

The PWM flip-flop 234 generates a gate driver control signal VC to control the switching operation of the power switch 11 according to the ON control signal NC and the OFF control signal FC. The PWM flip-flop 234 includes a set terminal S to which the ON control signal NC is input and a reset terminal R to which the OFF control signal FC is input. The PWM flip-flop 234 outputs a high-level gate driver control signal VC through an output terminal Q when a high-level signal is input to the set terminal S. The PWM flip-flop 234 outputs a low-level gate driver control signal VC through the output terminal Q when a high-level signal is input to the reset terminal R. When the set terminal S and the reset terminal R both receive low-level signals, the PWM flip-flop 233 maintains a current gate driver control signal VC.

The gate driver 235 generates a gate signal Vgs that turns off the power switch 11 according to the gate driver control signal VC. The gate driver 235 generates a high-level gate signal to turn on the power switch 11 when a high-level gate driver control signal VC is input, and generates a low-level gate signal Vgs to turn off the power switch 11 when a low-level gate driver control signal VC is input.

Figure 3:
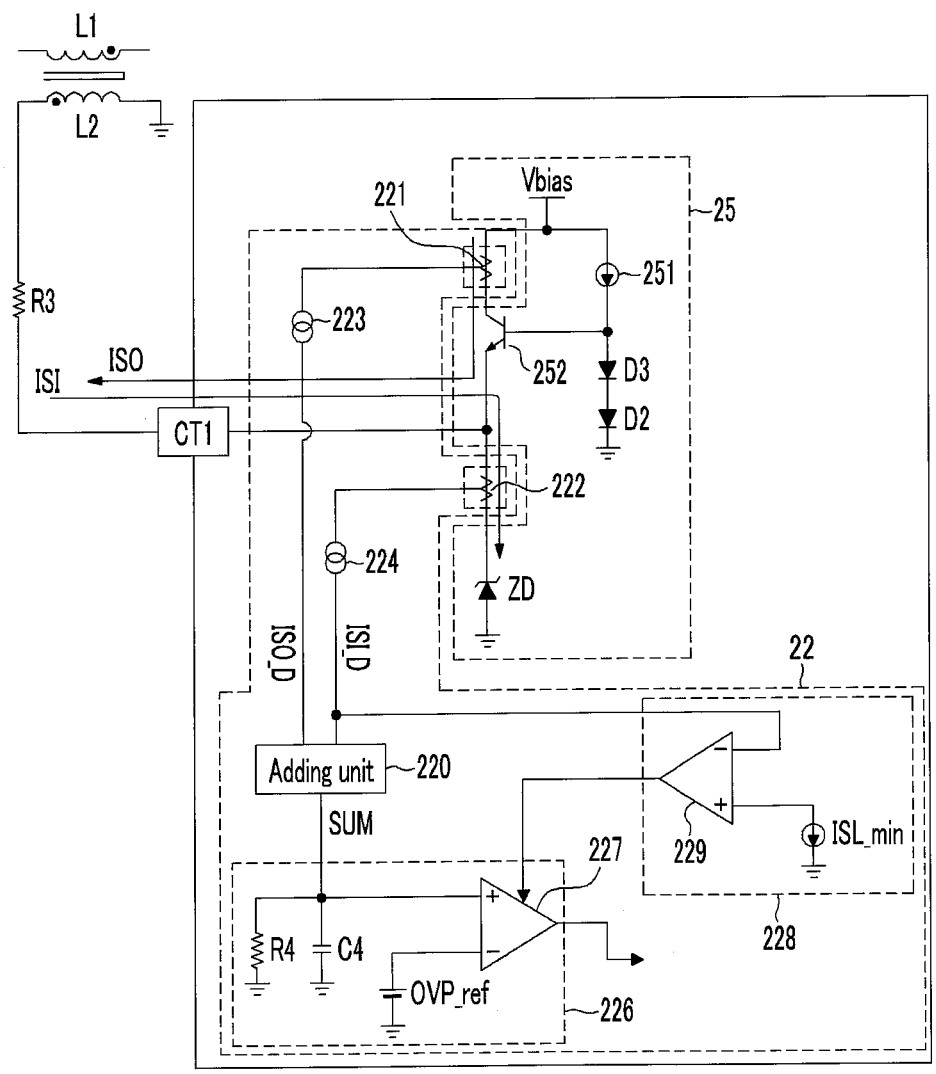
FIG. 3 shows a clamping unit and an over-voltage protection unit according to the exemplary embodiment of the present invention.

Hereinafter, the clamping unit 25 and the over-voltage protection unit 22 according to the exemplary embodiment of the present invention will be described with reference to FIG. 3. FIG. 3 shows the clamping unit 25 and the over-voltage protection unit 22 according to the exemplary embodiment of the present invention.

The clamping unit 25 controls the zero current detection voltage Vzcd to be higher than the negative clamping voltage VCN and lower than the positive clamping voltage VCP. The clamping unit 25 supplies the source current ISO to the auxiliary inductor L2 when the auxiliary voltage Vaux is lower than the negative clamping voltage VCN. Then, the zero current detection voltage Vzcd equals the sum of the auxiliary voltage Vaux and a drop voltage in the zero-current detection resistor R3, and in this case, the source current ISO is as given in Equation 3.

The clamping unit 25 subtracts the sink current ISI from the current flowing in the auxiliary inductor L2 when the auxiliary voltage Vaux is higher than the positive clamping voltage VCP. Then, the zero current detection voltage Vzcd equals a value obtained by subtracting the drop voltage in the zero-current detection resistor R3 from the auxiliary voltage Vaux, and in this case, the sink current ISI is as given in Equation 4.

In further detail, the clamping unit 25 includes a constant current source 251, a bipolar junction transistor (BJT) 252, diodes D2 and D3 connected in series, and a Zener diode ZD. The constant current source 251 generates a constant current by using a bias voltage Vbias, and controls a constant current flow to the diodes D2 and D3. The bias voltage Vbias is supplied to a collector of the BJT 252, and a base of the BJT 252 is connected to an anode of the diode D2. An emitter of the BJT 252 is connected to the connection terminal CT1 so that the zero current detection voltage Vzcd is supplied to the emitter. A cathode of the Zener diode ZD is connected to the connection terminal CT1, and an anode thereof is grounded.

When a voltage difference between the base and the emitter of the BJT 252 is higher than a threshold voltage, the BJT 252 is turned on. The diode D2 and the diode D3 are connected in series between the ground and the base of the BJT 252, and a voltage of the base becomes the sum of the threshold voltages of the two diodes D2 and D3. For example, when the threshold voltages of the diodes D2 and D3 are respectively 0.7V, the base voltage becomes 1.4V, and when the emitter voltage is lower than 0.7V, the BJT 252 is turned on. When the BJT 252 is turned on and the source current ISO flows to the auxiliary inductor L2, the emitter voltage is increased by the resistor R3 and the source current ISO. When the emitter voltage is higher than 0.7V, the BJT 252 is turned off so that the source current ISO does not flow.

When the auxiliary voltage Vaux becomes a negative voltage through the above-described manner, the zero current detection voltage Vzcd is maintained at 0.7V by the source current ISO supplied from the clamping unit 25. 0.7V is the negative clamping voltage VCN that is predetermined for convenience of description, and thus it may be modified in design. The number of serially connected diodes D2 and D3 is determined by the negative clamping voltage VCN, and a serial diode string formed of at least one diode is connected to the base of the BJT 252.

When the auxiliary voltage Vaux is higher than the positive clamping voltage VCP, the Zener diode ZD is turned on so that the sink current ISI flows through the Zener diode ZD. The positive clamping voltage VCP according to the exemplary embodiment of the present invention is a breakdown voltage of the Zener diode ZD. Therefore, the positive clamping voltage VCP can be controlled by using the Zener diode ZD.

The over-voltage protection unit 22 determines whether the output voltage Vout is an over-voltage by using the sink current ISI and the source current ISO. The over-voltage protection unit 22 determines that the output voltage Vout is the over-voltage when the sum of the sink current ISI and the source current ISO exceeds a predetermined over-voltage reference value. In this case, determination of the over-voltage is not performed when the input voltage Vin is lower than a predetermined level in order to prevent malfunction of the over-voltage protection unit 22.

As the input voltage Vin is high, the peak value of the input voltage Vin and a difference between the output voltage Vout and the input voltage Vin is decreased. When the difference is multiplied by the turn ratio n which is lower than 1, the multiplied difference is decreased with the turn ratio n. Therefore, n(Vout−Vin) can be lower than the positive clamping voltage VCP. If the power switch 11 is turned off and the input voltage Vin reaches the peak value, the sink current ISI has a negative value when the n(Vout−Vin) is lower than the positive clamping voltage VCP in Equation 4. However, since the Zener diode ZD is not turned on in a real circuit, the sink current ISI is not generated.

When the peak value of the input voltage Vin is high and the power switch 11 is turned on, the source current ISO has a very high value because the source current ISO is determined according to a result of the multiplication of the input voltage Vin and the turn ratio n as given in Equation 3. In this case, according to Equations 3 and 4, the source current ISO is offset by the sink current ISI which is a negative value so that the source current ISO does not exceed the over-voltage reference value.

However, since the sink current ISI is not substantially generated, the source current ISO is not offset and thus exceeds the over-voltage reference value even though the output Vout is not an over-voltage. That is, the sink current is not generated due to the input voltage at the peak value, and the output voltage is erroneously determined as an over-voltage due to a high input voltage.

Figure 4A:
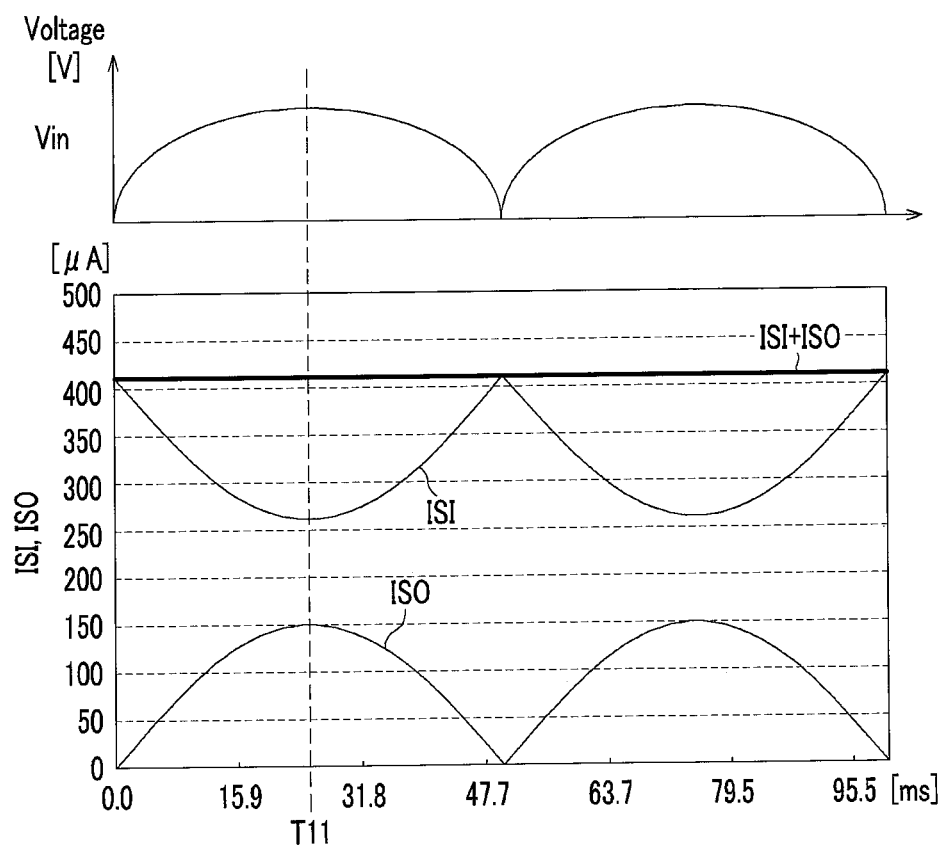
FIG. 4A shows an input voltage, an output voltage, a source current, and a sink current when an input AC voltage of AC power is 85Vac and an output voltage is in a normal range.
Figure 4B:
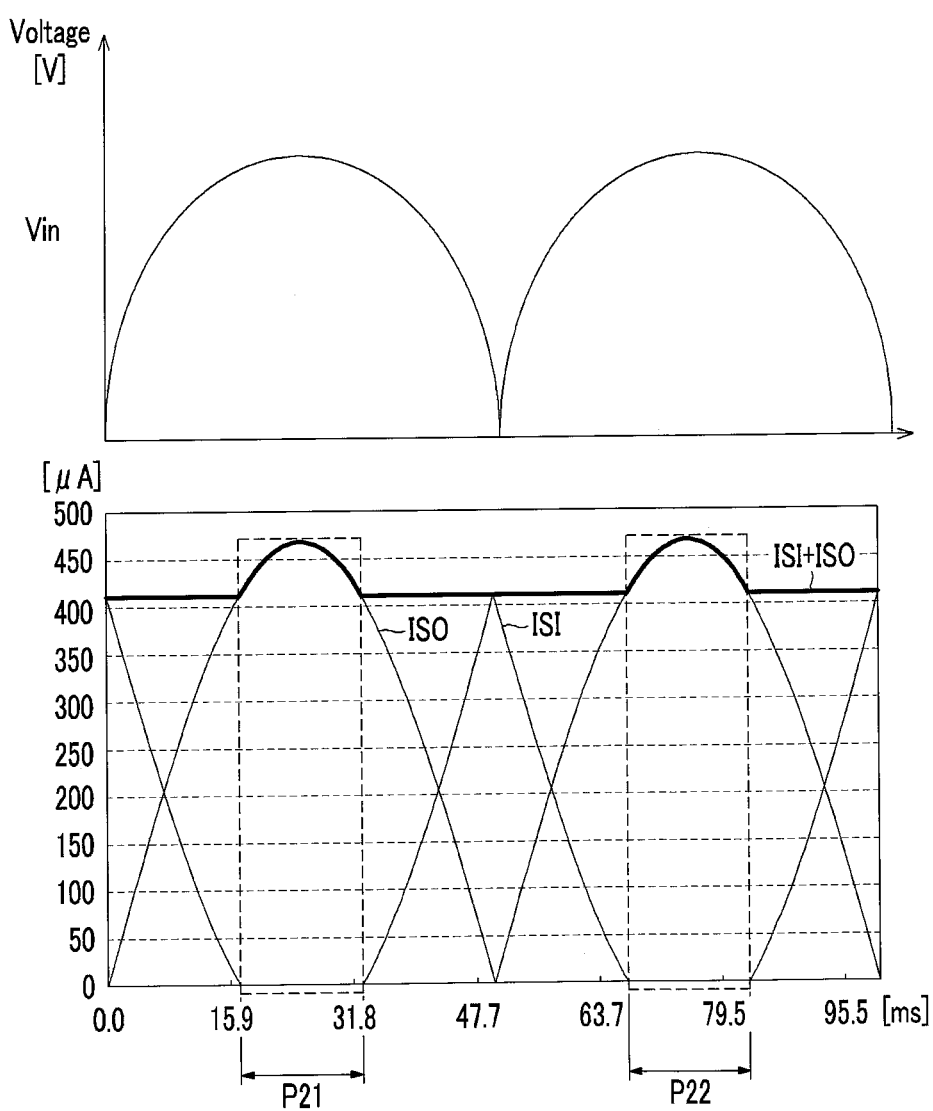
FIG. 4B shows an input voltage, an output voltage, a source current, and a sink current when the input AC voltage of the AC power is 265Vac and the output voltage is in the normal range.

Referring to FIG. 4A and FIG. 4B, the case in which the output voltage in a normal range is determined to be an over-voltage will be described. As previously described, such a malfunction occurs when the input voltage Vin reaches the peak value, and therefore, the source current and the sink current when the input voltage Vin is at the peak level will be observed.

FIG. 4A shows the input voltage Vin, the output voltage Vout, the source current ISO, and the sink current ISI when an AC voltage of the AC power source is 85Vac and the output voltage is in the normal range.

In further detail, the turn ratio n is set to 1/10, the zero-current detection resistor R3 is set to 80kO, the negative clamping voltage VCN is set to 0.7V, and the positive clamping voltage VCP is set to 6V. In addition, the power factor current circuit is set to operate to maintain the output voltage at 390Vdc. Hereinafter, 390Vdc is referred to as a normal voltage. When the output voltage exceeds 450Vdc, the power factor correction circuit determines the output voltage to be an over-voltage.

When the output voltage is 450Vdc, the sum of the sink current and the source current is 496.3 μA according to Equation 5. Therefore, a reference value of the over-voltage may be set to be a value close to 496.3 μA. In the exemplary embodiment of the present invention, 496 μA is set to be the over-voltage reference value for convenience of description.

The source current ISO and the sink current ISI are respectively determined according to Equation 3 and Equation 4, and the AC voltage of the input AC power source is 85Vac in FIG. 4A. As shown in FIG. 4A, when the output voltage is maintained at a constant level, the sum of the source current ISO and the sink current 151 is maintained at a constant level.

When the AC voltage of the input AC power source AC is 85Vac, the input voltage Vin reaches the peak value at a time T11, and the peak value of the input voltage Vin is 85Vac×v2. When the input voltage Vin reaches the peak value and the output voltage is 390Vdc, the sink current ISI is 262.3 μA according to Equation 4 and the source current is 151.1 μA according to Equation 3. The sum of the two currents is 413.4 μA. Therefore, when the AC voltage is 85Vac and the output voltage is the normal voltage, the sum of the source current ISO and the sink current ISI has a value that is lower than the over-voltage reference value even though the input voltage Vin is at the peak level.

FIG. 4B shows the input voltage Vin, the output voltage Vout, the source current ISO, and the sink current ISI when the AC voltage of the input AC power source AC is 265Vac and the output voltage is in the normal range.

In further detail, the turn ratio n, the zero-current detection resistor R3, the negative clamping voltage VCN, the positive clamping voltage VCP, the normal voltage, and the over-voltage have the same conditions as described above.

When the source current ISO is determined according to Equation 3 and the AC voltage of the input AC power source AC is 265Vac, the input voltage Vin, the output voltage Vout, the source current ISO, and the sink current ISI are as shown in FIG. 4B. The sink current ISI is determined according to Equation 4, but the flow of the sink current ISI is different from Equation 4 in the surrounding area of the peak value of the input voltage Vin. This is because n(Vout−Vin), which is the auxiliary voltage Vaux, is lower than the positive clamping voltage VCP so that the Zener diode ZD is not turned on. Therefore, as shown in FIG. 4B, the sum of the source current ISO and the sink current ISI has a value in a convex shape according to the source voltage ISO during the periods P11 and P12.

When the AC voltage of the input AC power source AC is 265Vac, the input voltage Vin reaches the peak value at a time T21, and the peak value of the input voltage Vin is 265Vac× v2. When the input voltage Vin reaches the peak value and the output voltage is 390Vdc, the sink current ISI becomes −5.6 μA according to Equation 4 and the source current becomes 469.3μ according to Equation 3. The sum of the two currents is 463.7 μA. However, the sink current ISI is not substantially generated during the periods P11 and P12, and the sum of the sink current and the source current is 469.3 μA.

When the output voltage is maintained at 390Vdc and the input voltage reaches the peak value, a malfunction does not occur because the sum of the sink current and the source current is less than the over-voltage reference value.

However, when the peak value of the input voltage is influenced by noise, a difference between the over-voltage reference value and the sink current and the source current is 26.7 μA so that a malfunction may occur.

For example, when the peak value is increased by 6% at the time T12 due to noise when the input voltage reaches the peak value, the source current is 497.4 μA and the auxiliary voltage is lower than the positive clamping voltage so that the sink current is not generated. That is, the sum of the source current and the sink current is greater than the over-voltage reference value.

According to the exemplary embodiment of the present invention, whether or not the output voltage is an over-voltage is not determined in a period where the auxiliary voltage is lower than the positive clamping voltage so as to prevent occurrence of a malfunction. In further detail, the sink current ISI is sensed, and thus, when the sink current ISI does not flow or is less than a predetermined threshold value, the over-voltage is not determined. Hereinafter, the over-voltage protection unit 22 will be described in further detail with reference to FIG. 3.

The over-voltage protection unit 22 includes a detection current adding unit 220, a protection determining unit 226, and protection controller 228. The over-voltage protection unit 22 also includes a source current detector 221 and a sink current detector 222 respectively detecting a source current ISO and a sink current ISI. The over-voltage protection unit 22 includes a first current mirror unit 223 and a second current mirror unit 224 respectively mirroring currents detected by the source current detector 221 and the sink current detector 222, and transmitting the mirrored currents to the detection current adding unit 220.

The source current detector 221 detects the source current ISO and transmits the detected current to the first current mirror unit 223. The first current mirror unit 223 generates a detection current source ISO_D by mirroring the detected current.

The sink current detector 222 detects the sink current ISI and transmits the detected current to the second current mirror unit 224. The second current mirror unit 224 generates a detection sink current ISI_D by mirroring the detected current.

The detection current adding unit 220 generates a sum current SUM by adding the detection source current ISO_S and the detection sink current ISI_D.

Figure 5:
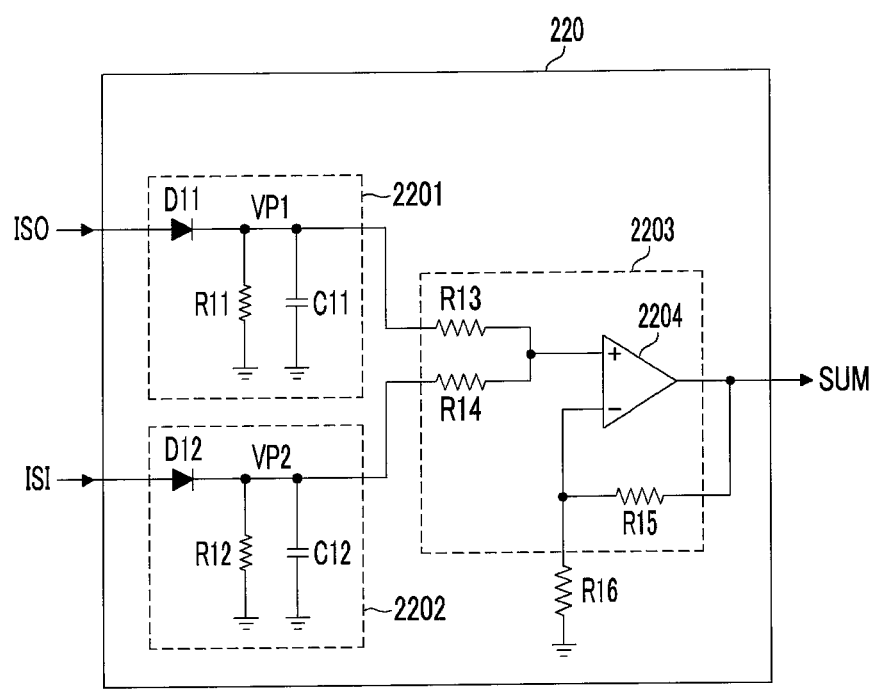
FIG. 5 shows a detection current adding unit according to the exemplary embodiment of the present invention.

FIG. 5 shows the detection current adding unit 220 according to the exemplary embodiment of the present invention.

The detection current adding unit 220 includes a first maintaining unit 2201, a second maintaining unit 2202, and an adding unit 2203.

The first maintaining unit 2201 includes a diode D11, a resistor R11, and a capacitor C11. An anode of the diode D11 is connected to the first current mirror unit 223, and when the diode D11 is turned on, the detection source current ISO_D is transmitted to the resistor R11. First ends of the resistor R11 and the capacitor C11 are connected to a cathode of the diode D11. When the diode D11 is turned on, the capacitor C11 is charged by the detection source current ISO_D transmitted through the diode D11. Hereinafter, a voltage charged to the capacitor C11 is referred to as a first peak voltage VP1.

The second maintaining unit 2202 includes a diode D12, a resistor R12, and a capacitor C12. An anode of the diode D12 is connected to the second current mirror unit 224, and when the diode D12 is turned on, the detection sink current ISI_D is transmitted to the resistor R12. First ends of the resistor R12 and the capacitor C12 are connected to a cathode of the diode D12. When the diode D12 is turned on, the capacitor C12 is charged by the detection sink current ISI_D transmitted through the diode D12. Hereinafter, a voltage charged to the capacitor C12 is referred to as a second peak voltage VP2.

Since the source current ISO is generated when the power switch 11 is turned on, the detection source current ISO_D is also generated when the power switch 11 is turned on. Therefore, the first peak voltage VP1 is generated by a detection source current generated during a turn-on period of the power switch 11. The source current ISO is determined according to an input voltage, the input voltage has a full-wave rectified waveform, and a switching period of the power switch 11 is very short. That is, since the input voltage is almost constant during a switching period of the power switch, a source current ISO flowing during a previous turn-on period of the power switch is substantially equal to a source current ISO flowing during the present turn-on period of the power switch. Therefore, a first peak voltage of the before turn-on period is almost the same as that of the present turn-on period.

Although unlikely, the sink current ISI may be generated when the power switch 11 is turned off, and therefore the detection sink current ISI_D is also generated when the power switch 11 is turned off. Therefore, the second peak voltage VP2 is generated during a turn-off period of the power switch 11. The sink current ISI is determined according to a difference of the input voltage and the output voltage, the input voltage has a full-wave rectified waveform, and the switching period of the power switch 11 is very short. That is, since the input voltage is almost constant during a switching period of the power switch and the output voltage is also maintained at a constant level, a sink current ISI flowing during a previous turn-on period of the power switch is substantially equal to a sink current ISI flowing during the present turn-on period of the power switch. Therefore, a second peak voltage of the before turn-on period is almost the same as that of the present turn-on period.

As described, although the first and second peak voltages VP1 and VP2 are generated at different times, they are charged by the capacitor C11 and the capacitor C12 and then maintain the charging state and therefore the first and second peak voltages generated at the same switching period can be added.

The adding unit 2203 is realized by using a non-inverting summation method, and includes a comparator 2204 having an inversion (−) terminal and a non-inversion (+) terminal. The detection current adding unit 220 includes two resistors R13 and R14 of which first ends are connected to the non-inversion (+) terminal and two resistors R15 and R16 of which first ends are connected to the inversion (−) terminal. A second end of the resistor R13 is connected to a first end of the capacitor C11, and the first peak voltage VP1 is transmitted to the second end of the resistor R13. A second end of the resistor R14 is connected to a first end of the capacitor C12, and the second peak voltage VP2 is transmitted to the second end of the resistor R14. A second end of the resistor R16 is grounded, and a second end of the resistor R15 is connected to an output end of the comparator 2204.

A sum voltage SUM which is an output voltage of the comparator 2204 is as given in Equation 6.

$$SUM=(1+R15/R16, R14VP1+R13VP2)/(R13+R14) \quad \text{[Equation 6]}$$

In this case, when R13 and R14 are equivalent to each other and the R15 and R16 are equivalent to each other, the sum voltage SUM is as given in Equation 7.

$$SUM=VP1+VP2 \quad \text{[Equation 7]}$$

The protection controller 228 compares the detection sink current ISI_D and a predetermined threshold current ISI_min, and determines an over-voltage according to the comparison result. The protection controller 228 operates the protection determining unit 226 when the detection sink current ISI_D is less than the threshold current ISI_min, and operates the protection determining unit 226 when the detection sink current ISI_D is greater than the threshold current ISI_min.

The protection controller 228 includes a current comparator 229, and the threshold current ISI_min is sinked at the non-inversion (−) terminal of the current comparator 229 and the detection source current ISI_D is supplied to the inversion (+) terminal. The current comparator 229 generates a high-level control signal ED to disable the protection determining unit 226 when the detection source current (ISI_D) is less than the threshold current ISI_min, and generates a low-level control signal ED to enable the protection determining unit 226 when the detection source current (ISI_D) is greater than the threshold current ISI_min. In this case, the threshold current ISI_min is 0 or close to 0. Since the sink current ISI is not generated when the auxiliary voltage is lower than the positive clamping voltage, the threshold current ISI_min can be set to 0 A. Alternatively, a predetermined margin is provided and thus the threshold current ISI_min is set close to zero so as to not determine the over-voltage in the case that the sink current ISI hardly flows.

The protection determining unit 226 determines the over-voltage by using the sum voltage SUM when enabled. The protection determining unit 226 is enabled or disabled by the control signal ED output from the protection controller 228.

The protection determining unit 226 includes an over-voltage comparator 227, a reference voltage source OVP_ref supplying a reference voltage for over-voltage determination (hereinafter referred to as an over-voltage reference voltage), a resistor R4, and a capacitor C4. The over-voltage reference voltage corresponds to the over-voltage reference value. Since the sum result of the source current and the sink current is given as the sum voltage according to the exemplary embodiment of the present invention, the over-voltage reference value is set to the over-voltage reference voltage. However, the present invention is not limited thereto.

As a low-pass filter, the capacitor C4 is connected to the resistor R4 in parallel and removes noise of the sum voltage SUM. The over-voltage comparator 227 is enabled/disabled according to the control signal ED, and generates a high-level over-voltage protection signal OVP when the sum voltage SUM is higher than the over-voltage reference voltage when being enabled. The over-voltage comparator 227 generates a low-level over-voltage protection signal OVP when the sum voltage SUM is lower than the over-voltage reference voltage. An OR gate 232 generates a high-level off control signal FC by the high-level over-voltage protection signal OVP.

Then, the PWM flip-flop 234 generates a low-level gate driver control signal VC, and the power switch is turned off by a low-level gate signal Vgs.

The over-voltage protection unit 22 of the previous exemplary embodiment can be realized using other methods. The first maintaining unit 2201 and the second maintaining unit 2202 are included in the detection current adding unit 220, but other configurations that perform the same function of the first and second maintaining units 2201 and 2202 may be provided at the outside of the detection current adding unit 220.

Hereinafter, an over-voltage protection unit according to another exemplary embodiment of the present invention will be described with reference to FIG. 6.

Figure 6:
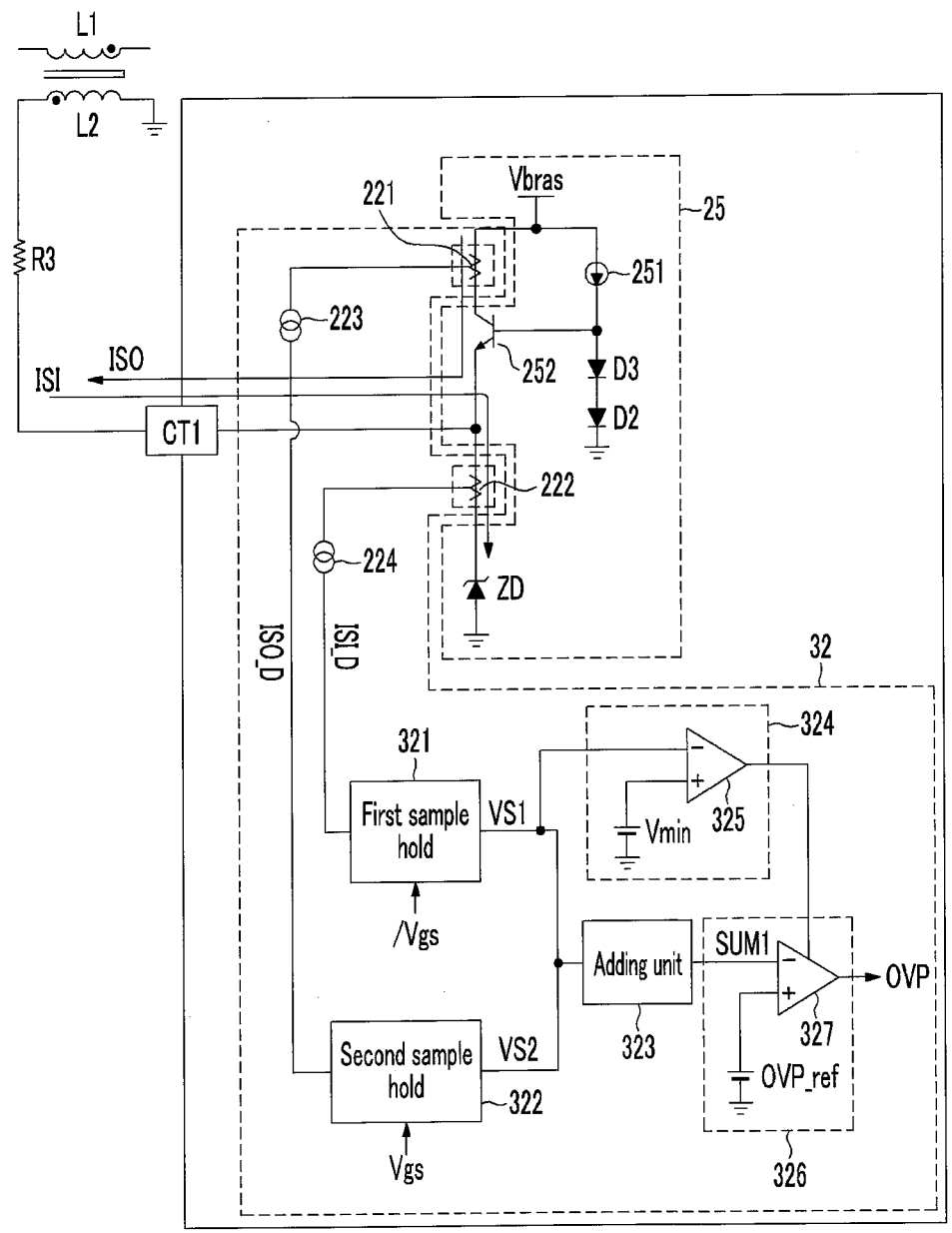
FIG. 6 shows an over-voltage protection unit according to another exemplary embodiment of the present invention.

FIG. 6 shows an over-voltage protection unit according to another exemplary embodiment of the present invention. For description of an over-voltage protection unit 32, a clamping unit 25 is also shown in FIG. 6.

The over-voltage protection unit 32 determines whether or not an output voltage Vout is over-voltage using a sink current ISI and a source current ISO. Like the over-voltage protection unit 22, the over-voltage protection unit 32 detects the sink current ISI and the source current ISO and determines the output voltage Vout to be an over-voltage when the sum of the sink current ISI and the source current ISO is greater than a predetermined over-voltage reference value. In addition, the over-voltage protection unit 32 does not determine whether or not the output voltage Vout is an over-voltage when an input voltage Vin is higher than a predetermined value to thereby prevent malfunction of the over-current protection unit 32.

As in the previous exemplary embodiment, the over-voltage protection unit 32 includes a source current detector 221, a sink current detector 222, a first current mirror unit 233, and a second current mirror unit 224. The over-voltage protection unit 32 further includes a first sample hold 321, a second sample hold 322, an adding unit 323, a protection determining unit 324, and a protection controller 326.

The first sample hold 321 samples and holds a detection sink current ISI_D according to an inverse gate signal Ngs inverted from a gate signal. In further detail, the first sample hold 321 samples the detection sink current ISI_D for a predetermined time period for a period during which the inverse gate signal /Vgs is in high level, that is, the turn-off period of a power switch 11, and holds the sampled voltage to generate a first sampling voltage VS1. The second sample hold 322 samples and holds a detection source current ISO_D according to the gate signal Vgs. In further detail, the second sample hold 322 samples the detection source current ISO_D for a predetermined time period for a period during which the gate signal Vgs is in high level, that is, in the turn-on period of the power switch 11, and holds the sampled voltage to generate a second sampling voltage VS2.

The adding unit 323 generates a sum voltage SUM1 by adding the first sampling voltage VS1 and the second sampling voltage VS2. A configuration of the adding unit 323 may be the same as that of the adding unit 2203 of the previous exemplary embodiment shown in FIG. 5. Thus, the sum voltage SUM1 may be equivalent to the sum of the two sampling voltages VS1 and VS2.

The protection controller 324 disables the protection determining unit 325 to prevent malfunction of the over-voltage protection unit 32 when the first sampling voltage VS1 is lower than a predetermined threshold voltage Vmin. When the first sampling voltage VS is higher than the threshold voltage Vmin, the protection controller 324 enables the protection determining unit 326.

The protection controller 324 includes a comparator 325, and the comparator 325 includes an inversion (−) terminal to which the first sampling voltage VS is input and a non-inversion (+) terminal to which the threshold voltage Vmin is input. When an auxiliary voltage Vaux is lower than a positive clamping voltage VCP, no sych current ISI is generated, and therefore the threshold voltage Vmin may be set to 0V. Alternatively, a predetermined margin is provided and thus the threshold voltage Vmin is set close to zero so as to not determine the over-voltage in the case that the sink current ISI hardly flows.

The protection determining unit 326 includes an over-voltage comparator 327, and the over-voltage comparator 327 includes an inversion (−) terminal connected with a reference voltage source OVP_ref and a non-inversion (+) terminal to which the sum voltage SUM1 is transmitted. The over-voltage comparator 327 generates an over-voltage protection signal OVP when the sum voltage SUM1 is higher than a voltage of the reference voltage source OVP_ref. The over-voltage comparator 327 is disabled when an output of the protection controller 324 is in high level, and enabled when the output of the protection controller 324 is in low level.

As described, in the present exemplary embodiment, the first sample hold 321 is operated according to the inverse gate signal Ngs and the second sample hold 322 is operated according to the gate signal Vgs such that the sink current ISI and the source current IOS are sampled and held for each switching period of the power switch 11, and accordingly the sum voltage SUM1 can be further accurately generated.

When the sampling and holding are controlled according to the switching operation of the power switch 11, an error may occur in the sum voltage under a light load condition.

In the case of the light load condition, the turn-on period of the power switch 11 is very short so that an insufficient amount of energy is charged in an inductor L1. In this case, when the power switch 11 is turned off, a drain voltage VDS becomes a waveform that is similar to a sine wave according to resonance during the turn-off period. The auxiliary voltage Vaux also becomes arbitrary according to the drain voltage VDS, and a period during which the auxiliary voltage Vaux is low and thus no sink current ISI is generated is generated during the turn-off period. When the first sample voltage VS1 is generated during the period, the sum voltage includes an error. Then, the output voltage cannot be accurately predicted using the sum voltage.

Furthermore, an error may occur in the sum voltage according to the magnitude of the input voltage Vin.

The fluctuation of the drain voltage VDS according to the switching operation of the power switch 11 is reflected to the auxiliary voltage Vaux of an auxiliary coil L2 such that a predetermined delay occurs. In further detail, the delay is increased as the input voltage Vin is increased. In addition, the delay is increased as the input voltage Vin becomes closer to the peak value.

As the fluctuation of a voltage at both terminals of the inductor L1 according to the switching operation is high, a response speed of the auxiliary coil L2 and the auxiliary voltage Vaux is increased. A difference between the voltage at both terminals of the inductor L1 during the turn-on period of the power switch 11 and the voltage at both terminals of the inductor L1 during the turn-off period of the power switch 11 is decreased as the input voltage Vin is increased.

Thus, as the input voltage Vin is increased and the input voltage Vin is closer to the peak value, the delay is increased.

In addition, time is consumed from a time point that the gate signal is internally generated for the drain voltage VDS to be fluctuated by controlling the switching and the fluctuated drain voltage VDS to be reflected to the auxiliary coil so as to fluctuate the auxiliary voltage Vaux. In further detail, since the polarity of the voltage at both terminals of the inductor L1 is changed according to the switching operation, time for changing the polarity of the auxiliary voltage is also required.

Thus, the sampling time point should be set to a time point that is properly delayed from the turn-on time and the turn-off time.

When the first sampling voltage VS1 is generated during the delay, the sum voltage includes an error. Then, the output voltage cannot be accurately predicted using the sum voltage.

An over-voltage protection unit according to another exemplary embodiment of the present invention further includes a delay unit that properly controls a sampling time point in order to prevent occurrence of a sampling error under a light load condition and according to magnitude of the input voltage.

Figure 7:
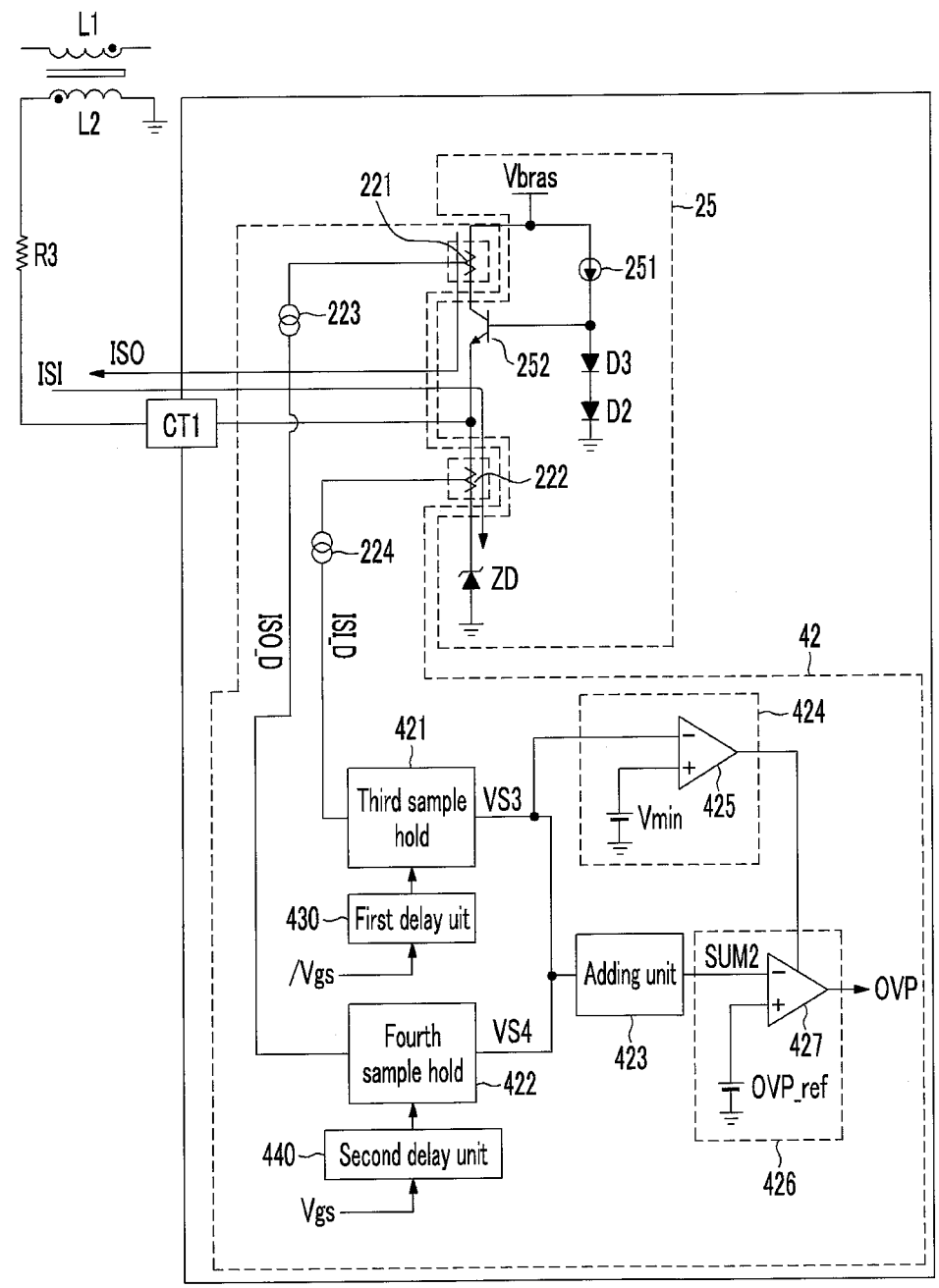
FIG. 7 shows an over-voltage protection unit according to another exemplary embodiment of the present invention.

FIG. 7 shows an over-voltage protection unit according to another exemplary embodiment of the present invention.

FIG. 7 illustrates an over-voltage protection unit 42 and a clamping unit 25. Compared to the previous exemplary embodiment, the present exemplary embodiment further includes a first delay unit 430 and a second delay unit 440.

Other configurations of the present exemplary embodiment are the same as those of the previous exemplary embodiment, and therefore no further description will be provided.

The first delay unit 430 generates a third sampling voltage VS3 by operating a third sample hold 421 after a predetermined first delay period from the turn-off time of a power switch 11. In further detail, the first delay 430 generates a first sampling pulse SP1 after the first delay period from a time point that an inverse gate signal Ngs becomes high level and transmits the first sampling pulse SP1 to the third sample hold 421. The third sample hold 421 is synchronized with the first sampling pulse SP1 and samples and holds a detection sink current ISI_D to generate a third sampling voltage VS3.

The second delay unit 440 generates a fourth sampling voltage VS4 by operating a fourth sample hold 422 after a predetermined second delay period from the turn-on time of the power switch 11. In further detail, the second delay unit 440 generates a second sampling pulse SP2 after the second delay period from a time point that the gate signal Vgs becomes high level and transmits the second sampling pulse SP2 to the fourth sample hold 422. The fourth sample hold 421 is synchronized with the second sampling pulse SP2 and samples and holds a detection source current ISO_D to generate a fourth sampling voltage VS4.

An adding unit 423 generates a sum voltage SUM2 by adding the third sampling voltage VS3 and the fourth sampling voltage VS4. A configuration of the adding unit 423 may be the same as that of the adding unit of the previous exemplary embodiment.

Hereinafter, controlling of the sampling time point by the first and second delay units 430 and 440 will be described in further detail.

Figure 8:
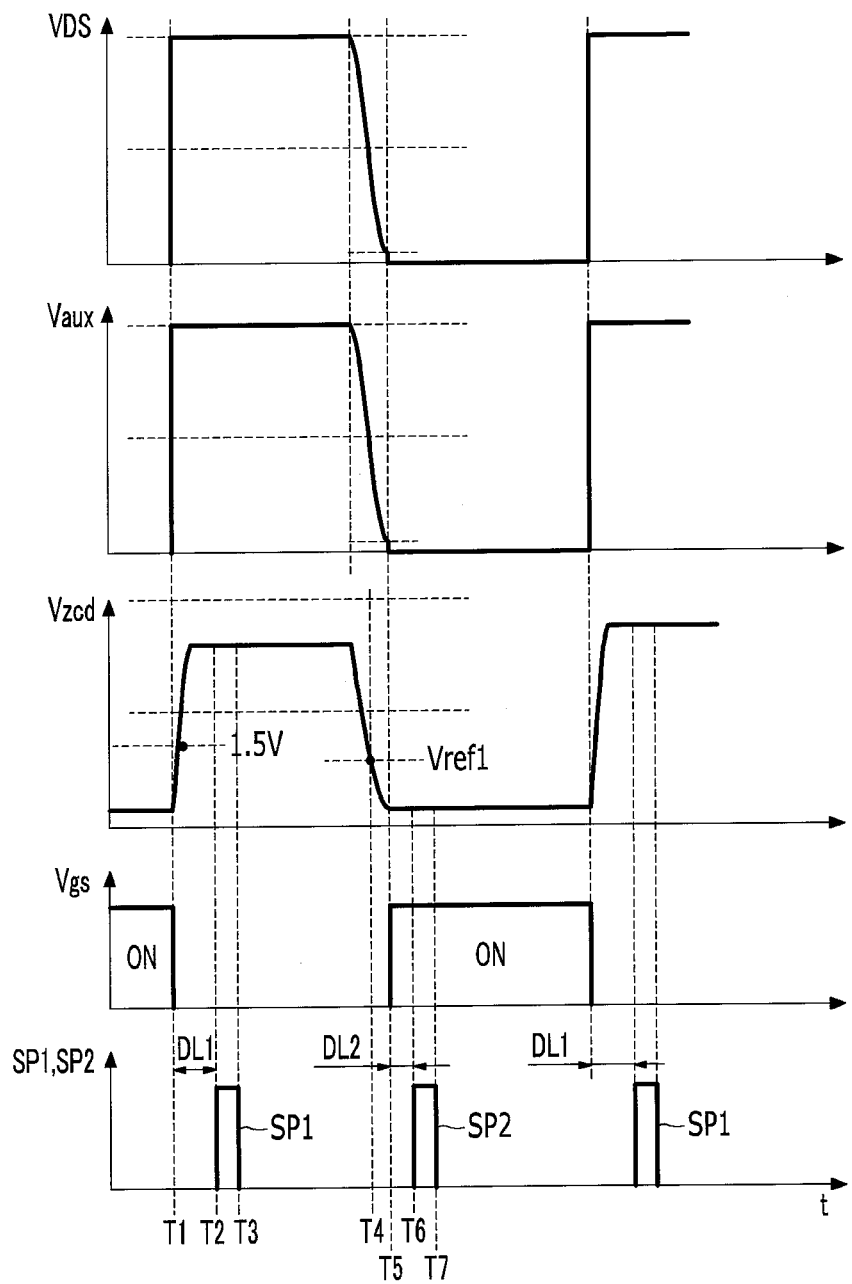
FIG. 8 shows a sampling time point of an over-voltage protection unit according to another exemplary embodiment of the present invention.

FIG. 8 shows a sampling time point of an over-voltage protection unit according to the present exemplary embodiment.

Figure 9:
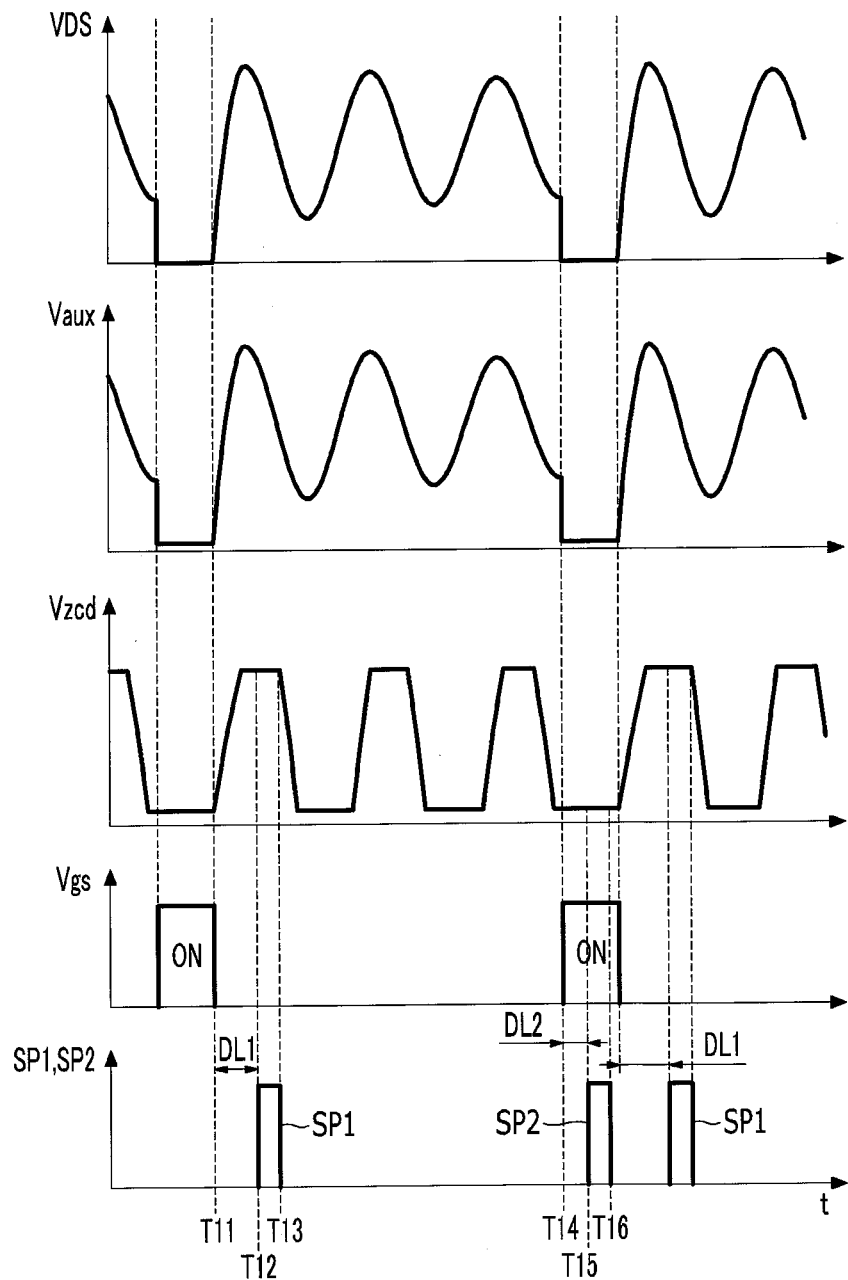
FIG. 9 shows a sampling time point of an over-voltage protection unit according to another exemplary embodiment of the present invention.

FIG. 9 shows the sampling time point of the over-voltage protection unit under the light load condition according to the present exemplary embodiment.

As shown in FIG. 8, when a gate signal Vgs becomes low level at time T1, a power switch 11 is turned off and the drain voltage DVS is increased to the output voltage Vout. The voltage at both terminals of the inductor L1 is a voltage obtained by subtracting the input voltage Vin from the output voltage Vout, and therefore the auxiliary voltage Vaux becomes a voltage obtained by multiplying a turn ratio n to (Vout−Vin). An increase slope of the auxiliary voltage becomes less steep by a resistor R3 so that a zero current detection voltage Vzdc is increased at the time T1 as shown in FIG. 8.

The first delay unit 430 generates the first sampling pulse SP1 at a time T2 delayed for a first delay period DL1 from a falling time of the gate signal Vgs and transmits the first sampling pulse SP1 to the third sample hold 421. The third sample hold 421 generates the third sampling voltage VS3 by sampling and holding the detection sink current ISI_D during a period T2 to T3 by the first sampling pulse SP1.

A gate signal Vgs that turns on the power switch 11 is generated at a time T5 that is a time delayed for a predetermined time from a time T4 at which the zero current detection voltage Vzcd reaches a predetermined reference voltage. That is, the gate signal Vgs becomes high level at the time T5.

The second delay 440 generates the second sampling pulse SP2 at a time T6 delayed for a second delay period DL2 from a time T14 at which the gate signal Vgs increases and transmits the second sampling pulse SP2 to the fourth sample hold 422. The fourth sample hold 422 generates the fourth sampling voltage VS4 by sampling and holding the detection source current ISO_D during a period T6 to T7 by the second sampling pulse SP2.

The first delay period and the second delay period will be described in further detail with reference to FIG. 9.

As shown in FIG. 8, when not in the light load condition, a falling period of the drain voltage VDS occurs once during a period from the turn-off period of the power switch 11 to the turn-on period.

However, under the light load condition, the falling period of the drain voltage VDS occurs at least twice during the period from the turn-off period of the power switch 11 to the turn-on period. Thus, the third sample hold 421 can generate the third sampling voltage VS3 during a period in which the zero current detection voltage Vzcd is decreased and maintained with a low voltage during the turn-off period.

In addition, although the drain voltage VDS is rapidly increased to the output voltage Vout in FIG. 8, the drain voltage VDS in FIG. 9 is increased according to a sine wave. Accordingly, the zero current detection voltage Vzcd is increased with a predetermined slope from the turn-off time.

The first delay period DL1 according to the present exemplary embodiment is set in consideration of a time point that the zero current detection voltage Vzcd is increased after the turn-off and reaches the peak value. That is, the first delay period and the sampling period are set for sampling within a predetermined range with reference to the time point that the zero current detection voltage Vzcd reaches the peak value.

In addition, the zero current detection voltage Vzcd may be increasing or decreasing at the turn-on time.

Under the light load condition, the turn-off period may be determined according to the maximum frequency limit. As shown in FIG. 9, a switching frequency may be higher than the maximum frequency limit when the zero current detection voltage reaches a reference voltage Vref1 too fast after the turn-on time. In order to prevent this, a minimum turn-off time is provided.

In FIG. 9, a period T11 to T14 is the minimum turn-off time.

Under the light load condition, the zero current detection voltage Vzcd may be increasing or decreasing at the turn-on time when the turn-on time is determined not by the maximum frequency limit but by the zero current detection voltage Vzcd. Then, the fourth sampling voltage VS4 generated at the turn-on time includes an error and the sum voltage SUM2 also includes an error, and therefore over-voltage determination may be incorrect.

In order to avoid the incorrect determination and accurately sample the source current ISO, the fourth sample hold 432 samples and holds the detection source current ISO_D at a time delayed for the second delay period from the turn-on time to generate the fourth sampling voltage VS4.

In addition, FIG. 8 illustrates that the decrease of the zero current detection voltage Vzcd is terminated at the turn-on time T5, but as previously stated, a predetermined delay may occur for the fluctuated drain voltage VDS to be reflected to the auxiliary voltage at the turn-on time T5 and the fluctuation of the auxiliary voltage Vaux to be reflected to the zero current detection voltage Vzcd. The predetermined delay is shorter than the delay occurring under the light load condition, and therefore the fourth sampling voltage is generated according to the second delay period.

As shown in FIG. 9, under the light load condition, the first delay unit 430 generates the first sampling pulse SP1 at the time T12 delayed for the first delay period DL1 from the time T11 that the gate signal Vgs starts to decrease, and transmits the first sampling pulse SP1 to the third sample hold 421. The third sample hold 421 samples and holds the detection sink current ISI_D for a period T12 to T13 by the first sampling pulse SP1 to generate the third sampling voltage VS3.

When the minimum turn-off period is terminated at the time T14 according to the maximum frequency limit, the gate signal Vgs becomes high level. The second delay unit 440 generates the second sampling pulse SP2 at the time T15 delayed for the second delay period DL2 from the time T14 that the gate signal Vgs starts to increase and transmits the second sampling pulse SP2 to the fourth sample hold 422. The fourth sample hold 422 samples and holds the detection source current ISO_D during a period T15 to T16 by the second sampling pulse SP2 to generate the fourth sampling voltage VS4.

The source current and the sink current are sensed by setting the sampling time and the sampling time using the above-stated method, and the output voltage is predicted according to the sensing result to thereby improve accuracy in over-voltage determination.

As described, the power factor correction circuit and the driving method thereof according to the exemplary embodiment of the present invention can determine whether the output voltage Vout is an over-voltage by using the sum of the source current and the sink current that are generated according to the auxiliary voltage. That is, the over-voltage can be determined without direct detection of the output voltage Vout, thereby reducing power consumption.

In addition, the over-voltage protection unit 22 according to the exemplary embodiment of the present invention prevents malfunctions by not determining whether or not the auxiliary voltage Vaux of the auxiliary inductor L2 is lower than the positive clamping voltage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power factor correction circuit comprising:
an inductor receiving an input voltage and supplying output power;
a power switch connected to the inductor and controlling an inductor current flowing in the inductor;
an auxiliary inductor coupled to the inductor with a predetermined turn ratio; and
a power factor correction controller controlling the output power by controlling a switching operation of the power switch, and determining an over-voltage of an output voltage of the output power, wherein the power factor correction controller determines whether the output voltage is an over-voltage by using a sum of a source current and a sink current that control a zero current detection voltage to be included within a predetermined clamping range, the zero current detection voltage corresponding to an auxiliary voltage that is a both-end voltage of the auxiliary inductor.

2. The power factor correction circuit of claim 1, wherein the clamping range is lower than a positive clamping voltage and higher than a negative clamping voltage, and the sink current is generated when the auxiliary voltage is higher than the positive clamping voltage and the source current is generated when the source current is lower than the negative clamping voltage.

3. The power factor correction circuit of claim 2, wherein the power factor correction controller determines the output voltage as an over-voltage when the sum of the source current and the sink current is greater than a predetermined over-voltage reference value.

4. The power factor correction circuit of claim 2, wherein the power factor correction controller does not determine whether or not the output voltage is an over-voltage when the auxiliary voltage is lower than the positive clamping voltage.

5. The power factor correction circuit of claim 1, wherein the power factor correction controller comprises an over-voltage protection unit that respectively detects the sink current and the source current and adds them to generate a sum result, compares the sum result with an over-voltage reference value, and determines that the output voltage is an over-voltage when the sum result is greater than the over-voltage reference value.

6. The power factor correction circuit of claim 5, wherein the clamping range is lower than a positive clamping voltage and higher than a negative clamping voltage, and the power factor correction controller further comprises a clamping unit that generates the sink current when the auxiliary voltage is higher than the positive clamping voltage and generates the source current when the auxiliary voltage is lower than the negative clamping voltage.

7. The power factor correction circuit of claim 6, wherein the over-voltage protection unit does not determine whether or not the output voltage is an over-voltage when the auxiliary voltage is lower than the positive clamping voltage.

8. The power factor correction circuit of claim 7, wherein the over-voltage protection unit comprises:
a detection current adding unit adding a detection source current corresponding to the source current and a detection sink current corresponding to the sink current;
a protection determining unit determining whether or not the output voltage is an over-voltage by comparing the sum result with the over-voltage reference value; and
an auxiliary controller disabling the protection determining unit when the auxiliary voltage is lower than the positive clamping voltage.

9. The power factor correction circuit of claim 8, wherein the protection determining unit comprises a comparator that compares the sum result with the over-voltage reference value, and a protection controller disables the comparator of the protection determining unit when the auxiliary voltage is lower than the positive clamping voltage and enables the comparator of the protection determining unit when the auxiliary voltage is higher than the positive clamping voltage.

10. The power factor correction circuit of claim 9, wherein the protection controller comprises a comparator including a first input terminal to which the detection sink current is input and a second input terminal to which a predetermined threshold current is input, and the comparator of the protection controller generates a control signal that disables the protection determining unit when the detection sink current is less than the threshold current.

11. The power factor correction circuit of claim 10, wherein the comparator of the protection controller generates a control signal that enables the protection determining unit when the detection sink current is greater than the threshold current.

12. The power factor correction circuit of claim 8, wherein the over-voltage protection unit further comprises:
a source current detection unit detecting the source current;
a first current mirror unit generating a detection source current by mirroring the detected source current;
a sink current detection unit detecting the sink current; and
a second current mirror unit generating a detection sink current by mirroring the detected sink current.

13. The power factor correction circuit of claim 12, wherein the detection current adding unit comprises:
a first maintaining unit receiving the detection source current and generating a first peak voltage corresponding to the detection source current;
a second maintaining unit receiving the detection sink current and generating a second peak voltage corresponding to the detection sink current; and
an adding unit adding the first and second peak voltages and generating a sum voltage corresponding to the sum result.

14. The power factor correction circuit of claim 13, wherein the first maintaining unit comprises:
a first diode to which the detection source current is transmitted;
a first resistor of which a first end is connected to a cathode of the first diode and a second end is grounded; and
a first capacitor of which a first end is connected to the cathode of the first diode and a second end is grounded, and
wherein the second maintaining unit comprises: a second diode to which the detection sink current is transmitted; a second resistor of which a first end is connected to a cathode and a second end is grounded; and a second capacitor of which a first end is connected to the cathode of the second diode and a second end is grounded, and the first peak voltage is a first end voltage of the first capacitor and the second peak voltage is a first end voltage of the second capacitor.

15. The power factor correction circuit of claim 14, wherein the adding unit comprises:
a first resistor of which a first end receives the first peak voltage;
a second resistor of which a first end receives the second peak voltage;
a third resistor of which a first end is grounded;
a comparator including a first input terminal connected to the second end of the first resistor and the second end of the second resistor and a second input terminal connected to the second end of the third resistor; and
a fourth resistor of which a first end is connected to the second input terminal of the comparator and a second end connected to the output terminal of the comparator, wherein the sum result is a voltage at the output terminal of the comparator.

16. The power factor correction circuit of claim 1, wherein the power factor correction controller comprises an over-voltage protection unit that samples and holds the sink current by being synchronized at the turn-off time of the power switch to generate a first sampling voltage, samples and holds the source current by using synchronized at the turn-on time of the power switch to generate a second sampling voltage, adds the first sampling voltage and the second sampling voltage, compares the addition result with the over-voltage reference value, and determines the output voltage to be an over-voltage when the addition result is higher than the over-voltage reference value.

17. The power factor correction circuit of claim 16, wherein the over-voltage protection unit comprises:
a first sample hold unit generating the first sampling voltage according to an inverse gate signal inverted from a gate signal that controls the switching operation of the power switch;
a second sample hold unit generating the second sampling voltage according to the gate signal; and
an adding unit adding the first sampling voltage and the second sampling voltage.

18. The power factor correction circuit of claim 16, wherein the clamping range is lower than a positive clamping voltage and higher than a negative clamping voltage, and the power factor correction controller further comprises a clamping unit that generates the sink current when the auxiliary voltage is higher than the positive clamping voltage and generates the source current when the auxiliary voltage is lower than the negative clamping voltage.

19. The power factor correction circuit of claim 17, wherein the over-voltage protection unit does not determine whether or not the output voltage is an over-voltage when the auxiliary voltage is lower than the positive clamping voltage.

20. The power factor correction circuit of claim 1, wherein the power factor correction controller comprises an over-voltage protection unit that generates a third sampling voltage by sampling and holding the sink current at a time delayed for a first delay period from a turn-off time of the power switch, generates a fourth sampling voltage by sampling and holding the source current at a time delayed for a second delay period from a turn-on time of the power switch, adds the third sampling voltage and the fourth sampling voltage, compares the addition result with the over-voltage reference value, and determines the output voltage to be an over-voltage when the addition result is higher than the over-voltage reference value.

21. The power factor correction circuit of claim 20, wherein the over-voltage protection unit comprises:
a first delay unit receiving an inverse gate signal inverted from a gate signal that controls a switching operation of the power switch and generating a first sampling pulse at a time delayed for the first delay period from the turn-off time of the power switch;
a third sample hold unit generating the third sampling voltage according to the first sampling pulse;
a second delay unit receiving the gate signal and generating a second sampling pulse at a time delayed for the second delay period from the turn-on time of the power switch; and
a fourth sample hold unit generating the fourth sampling voltage according to the second sampling pulse.

22. The power factor correction circuit of claim 20, wherein the clamping range is lower than a positive clamping voltage and higher than a negative clamping voltage, and the power factor correction controller further comprises a clamping unit generating the sink current when the auxiliary voltage is higher than the positive clamping voltage and generating the source current when the auxiliary voltage is lower than the negative clamping voltage.

23. The power factor correction circuit of claim 22, wherein the over-voltage protection circuit does not determine whether or not the output voltage is an over-voltage when the auxiliary voltage is lower than the positive clamping voltage.

24. The power factor correction circuit of claim 1, wherein the power factor correction circuit does not determine whether or not the output voltage is an over-voltage when the sink current is not generated by the input voltage at the peak value and the source current is greater than the over-voltage reference value.

25. A driving method of a power factor current circuit including an inductor receiving an input voltage and supplying output power, a power switch connected to the inductor and controlling an inductor current flowing in the inductor, and an auxiliary inductor coupled to the inductor with a predetermined turn ratio, the driving method comprising:
   generating a source current and a sink current that control a zero current detection voltage to be included within a predetermined clamping range, the zero current detection voltage corresponding to an auxiliary voltage that is a both-end voltage of the auxiliary inductor;
   adding the source current and the sink current to generate a sum result; and
   determining whether or not an output voltage of the output power is an over-voltage by comparing the sum result and a predetermined over-voltage reference value.

26. The driving method of claim 25, wherein the clamping range is lower than a positive clamping voltage and higher than a negative clamping voltage, and
   the generating of the source current and the sink current comprises:
   generating the sink current when the auxiliary voltage is higher than the positive clamping voltage, and
   generating the source current when the auxiliary voltage is lower than the negative clamping voltage.

27. The driving method of claim 26, wherein the determining whether or not the output voltage is an over-voltage further comprises determining the output voltage as an over-voltage when the sum of the source current and the sink current is greater than the over-voltage reference value.

28. The driving method of claim 25, wherein whether or not the output voltage is an over-voltage is not determined when the sink current is not generated by the input voltage at the peak value and the source current is greater than the over-voltage reference value.

29. The driving method of claim 25, wherein the adding of the source current and the sink current comprises:
   generating a first sampling voltage by being synchronized at the turn-off time of the power switch and sampling and holding the source current;
   generating a second sampling voltage by being synchronized at the turn-on time of the power switch and sampling and holding the source current; and
   adding the first sampling voltage and the second sampling voltage.

30. The driving method of claim 25, wherein the adding of the source current and the sink current comprises:
   generating a third sampling voltage by sampling and holding the sink current at a time delayed for a first delay period from the turn-off time of the power switch;
   generating a fourth sampling voltage by sampling and holding the source current at a time delayed for a second delay period from the turn-on time of the power switch; and
   adding the third sampling voltage and the fourth sampling voltage.

31. The driving method of claim 30, wherein, in the generating of the third sampling voltage, a first sampling pulse is generated at a time delayed for the first delay period from the turn-off time of the power switch by an inverse gate signal inverted from a gate signal that controls switching operation of the power switch, and the third sampling voltage is generated according to the first sampling pulse.

32. The driving method of claim 30, wherein, in the generating of the fourth sampling voltage, a second sampling pulse is generated at a time delayed for the second delay period from the turn-on time of the power switch by the gate signal, and the fourth sampling voltage is generated according to the second sampling pulse.

* * * * *